(12) United States Patent
Paris et al.

(10) Patent No.: US 8,712,148 B2
(45) Date of Patent: Apr. 29, 2014

(54) GENERATING AGRICULTURAL INFORMATION PRODUCTS USING REMOTE SENSING

(75) Inventors: Jack F. Paris, Clovis, CA (US); Gregory E. Knoblauch, St. Charles, MO (US); Dean Grundman, Fort Collins, CO (US)

(73) Assignee: Monsanto Technology LLC, St. Louis, MO (US)

( * ) Notice: Subject to any disclaimer, the term of this patent is extended or adjusted under 35 U.S.C. 154(b) by 457 days.

(21) Appl. No.: 12/996,277

(22) PCT Filed: Jun. 5, 2009

(86) PCT No.: PCT/US2009/046481
§ 371 (c)(1),
(2), (4) Date: Feb. 18, 2011

(87) PCT Pub. No.: WO2009/149396
PCT Pub. Date: Dec. 10, 2009

(65) Prior Publication Data
US 2011/0135197 A1 Jun. 9, 2011

Related U.S. Application Data

(60) Provisional application No. 61/059,465, filed on Jun. 6, 2008.

(51) Int. Cl.
*G06K 9/00* (2006.01)

(52) U.S. Cl.
USPC ............. 382/165; 382/100; 382/162; 345/89; 345/589

(58) Field of Classification Search
CPC ......... G06T 11/00; G06T 7/00; G06T 11/001; G06T 2207/10048; G06T 2207/20221; G06T 3/4061; G06T 5/50; G06K 9/00637; G06K 9/0063; G06K 9/00657
USPC ................ 382/165, 100, 110, 190, 162, 191; 701/1, 2, 3, 4, 5; 348/89, 144, 14; 345/589, 441
See application file for complete search history.

(56) References Cited

U.S. PATENT DOCUMENTS 5,612,901 A * 3/1997 Gallegos et al. .................. 702/3
5,878,356 A 3/1999 Garrot, Jr. et al.
(Continued)

OTHER PUBLICATIONS

Blackburn et al., Towards the Remote Sensing of Matorral Vegetation Physiology: Relationships between Spectral Reflectance, Pigment, and Biophysical Characteristics of Semiarid Bushland Canopies, published in 1999 by Elsevier, p. 278-292.*

(Continued)

*Primary Examiner* — Mekonen Bekele
(74) *Attorney, Agent, or Firm* — Armstrong Teasdale LLP

(57) ABSTRACT

A method for generating a raster file based on a plurality of primary index raster files that are associated with an area of interest (AOI) uses a computer coupled to a remote sensing device via a network. The method includes receiving a plurality of AOI raster files via the network, and generating the primary index raster files including a green biomass index (GBI) raster file and a pigmentation index (PGI) raster file. The method also includes generating a plurality of levels for each of the primary index raster files, generating a combination vegetation index (CVIPP) raster file based on a highest level of the GBI and PGI raster files, and generating a corn soybean map (CSM) raster file based on the CVIPP raster file. The method also includes storing the CSM raster file into the memory, and displaying a CSM report based on the CSM raster file.

30 Claims, 21 Drawing Sheets

(56) References Cited

U.S. PATENT DOCUMENTS

| | | | |
|---|---|---|---|
| 5,999,650 | A | 12/1999 | Ligon |
| 6,366,681 | B1 | 4/2002 | Hutchins |
| 7,058,197 | B1* | 6/2006 | McGuire et al. ............... 382/100 |
| 7,068,816 | B1* | 6/2006 | Knoblauch et al. ............ 382/110 |
| 7,979,209 | B2* | 7/2011 | O'Hara et al. ..................... 702/1 |
| 8,411,903 | B2* | 4/2013 | Paris et al. ..................... 382/110 |
| 8,411,904 | B2* | 4/2013 | Paris et al. ..................... 382/110 |
| 8,411,905 | B2* | 4/2013 | Paris et al. ..................... 382/110 |
| 2003/0019408 | A1 | 1/2003 | Fraisse et al. |
| 2005/0114027 | A1* | 5/2005 | Boright et al. ..................... 702/3 |
| 2011/0134138 | A1* | 6/2011 | Paris et al. ..................... 345/589 |
| 2011/0135193 | A1* | 6/2011 | Paris et al. ..................... 382/162 |
| 2011/0135196 | A1* | 6/2011 | Paris et al. ..................... 382/165 |

OTHER PUBLICATIONS

Jackson et al., "Vegetation water content mapping using Landsat data derived normalized difference water index for corn and soybeans" published in 2004 by Elsevier, pp. 475-482.*

Vescovo, Loris, Gianelle, Damiano; Using the MIR bands in vegetation indices for the estimation of grassland biophysical parameters from satellite remote sensing in the Alps region of Trentino (Italy); Article; Advances in Space Research 41; Jan. 1, 2008; pp. 1764-1772.

Todd, S.W., Hoffer, R. M., Milchunas, D. G.; Biomass estimation on grazed and ungrazed rangelands using spectral indices; Article; International Journal of Remote Sensing; vol. 19, No. 3; Feb. 1, 1998; 427-438.

Xavier, A.C., Vettorazzi, C.A.; Mapping leaf area index through spectral vegetation indices in a subtropical watershed; Article; International Journal of Remote Sensing; vol. 25, No. 9; May 10, 2004; pp. 1661-1672.

International Search Report and Written Opinion based on PCT/US2009/046467; Sep. 16, 2009; 13 pgs.

Haboudane, Tremblay, Miller, Vigneault; Remote Estimation of Crop Chlorophyll Content Using Spectral Indices Derived From Hyperspectral Data; Article; IEEE Transactions on Geoscience and remote Sensing; vol. 46, No. 2; Feb. 2008; pp. 423-437.

Houborg, Soegaard, Boegh; Combining vegetation index and model inversion methods for the extraction of key vegetation biophysical parameters using Terra and Aqua MODIS reflectance data; Article; Remove Sensing of Environment; vol. 106, No. 1; pp. 39-58, Jul. 21, 2006.

North, Welmshurst, Burgham; Relationships Between Spectral Reflectance and Biophysical Characteristics of Degranded Shrubslands; Article; Geoscience and Remote Sensing Symposium, 2004; Sep. 2004; pp. 2054-2057.

International Search Report and Written Opinion based on PCT/US2009/046474; Sep. 15, 2009; 12 pgs.

De Lira, Batchily, Hongtao, Heute; Optical and Seasonal Variations Along the U.S. Mexico Border: and Analysis with Landset TM Imagery; Article; Geoscience and Remote Sensing Symposium, 2004; vol. 3, No. 20, Sep. 2004; pp. 1044-1045.

International Search Report and Written Opinion based on PCT/US2009/046479; Sep. 11, 2009; 12 pgs.

Chen, Haung, Jackson; Vegetation water content estimation for corn and soybeans using spectral indices derived from MODIS near- and short-wave infrared bands; Remote Sensing of Environment; vol. 98, No. 2-3; Oct. 15, 2005; pp. 225-236.

Daughtry, Gallo, Goward, Prince, Kustas; Special Estimates of Absorbed Radiation and Phytomass production in Corn and Soyben Canopies; Article; Remote Sensing of Environment; vol. 39; Jan. 1, 1992; pp. 141-152.

International Search Report and Written Opinion based on PCT/US2009/046481; Sep. 16, 2009; 14 pgs.

* cited by examiner

GENERATING AGRICULTURAL INFORMATION PRODUCTS USING REMOTE SENSING

BACKGROUND

The embodiments described herein relate generally to analyzing remotely-sensed data related to agriculture and, more particularly, to generating information products based on remotely-sensed data.

At least some known methods for processing multispectral (MS) imagery using a single formula that converts MS data into a single vegetation index (VI) based on typically two key spectral bands. For example, the two most often used spectral bands are red-light (RL) with wavelengths near 680 nanometers (nm) and a near-infrared, Band A (NA) with wavelengths near 830 nm. Moreover, at least some known methods require that the RL and NA raster values be converted to calibrated reflectance factor (RF) values.

Moreover, at least some known methods were defined with the expectation that input spectral "brightness" digital numbers (DNs) are valid reflectance factors known to be absolutely accurate. For example, at least some known methods use raw source-imagery DNs. Other known methods use valid, absolutely accurate reflectance factors. However, obtaining accurate values for RF, even for a limited number of spectral bands, is difficult and expensive to complete. Without accurate RF values, some known methods for processing MS imagery are invalid. Moreover, the single VI that is generated by some known methods does not relate well to one or more generally important biophysical properties of vegetation analysis, such as green biomass density (GBD), green leaf area index (GLAI), and/or absorbed photosynthetically-active radiation (APAR). Furthermore, at least some known methods that use valid, absolutely accurate reflectance factors include fixed coefficients that are not accurate across large time periods, such as a time period lasting years after an initial definition of the coefficients for an initial set of reflectance factor values.

Moreover, at least some known methods for processing MS imagery use pixel values obtained using a specific MS system, such as the Landsat 1, 2, 3, or 4's Multispectral Scanner System (MSS) or Landsat 4's Thematic Mapper (TM). Accordingly, only those spectral bands obtained by MSS or TM were available for use by such methods. Moreover, such methods included the use of fixed-value coefficients that are only useful when applied to the pixel values obtained by MSS or TM and, only under conditions where solar illumination was similar. As such, use of such methods is restricted. Furthermore, at least some known methods for processing MS imagery are susceptible to unwanted variation caused by hill shading and the like, which is known as brightness noise (BN), and are also susceptible to soil noise (SN). Some other methods are less susceptible to SN, but they use only two spectral bands or use a blue light (BL) band that is not available on all spacecraft-based imaging systems.

BRIEF DESCRIPTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a method is provided for generating a raster file based on a plurality of primary index raster files that are associated with an area of interest (AOI) using a computer coupled to a remote sensing device via a network, wherein the computer includes an input device, a display, and a memory. The method includes receiving a plurality of AOI raster files via the network, and generating the primary index raster files including a green biomass index (GBI) raster file, a pigmentation index (PGI) raster file, and a soil brightness index (SBI) raster file. The method also includes generating a plurality of levels for each of the primary index raster files based on the AOI raster files, generating a combination vegetation index (CVIPP) raster file based on a highest level of the GBI and PGI raster files, and generating a corn soybean map (CSM) raster file based on the CVIPP raster file. The method also includes storing the CSM raster file into the memory, and displaying a CSM report based on the CSM raster file In another aspect, an information system is provided for generating a raster file based on a plurality of primary index raster files that are associated with an area of interest (AOI). The information system includes a computer system having a memory and a processor coupled to the memory. The computer system is configured to receive a plurality of AOI raster files including a common land unit mask (CLUM) raster file, a federal information processing standards (FIPS) raster file, and an orthorectified reference image (ORI) of the AOI, and to generate the primary index raster files including a green biomass index (GBI) raster file, a pigmentation index (PGI) raster file, and a soil brightness index (SBI) raster file. The computer is also configured to generate a plurality of levels for each of the primary index raster files based on the AOI raster files, generate a combination vegetation index (CVIPP) raster file based on a highest level of the GBI and PGI raster files, and generate a corn soybean map (CSM) raster file based on the CVIPP raster file. The computer then stores the CSM raster file into the memory and displays a CSM report based on the CSM raster file.

In another aspect, one or more computer-readable storage media having computer-executable components are provided for generating a raster file based on a plurality of primary index raster files that are associated with an area of interest (AOI). The components include a data reception component that causes a processor to receive a plurality of AOI raster files via a network, and a primary index component that causes a processor to generate the primary index raster files including a green biomass index (GBI) raster file, a pigmentation (PGI) raster file, and a soil brightness index (SBI) raster file. A masking component causes a processor to generate a cloud mask raster file based on the PGI and SBI raster files. A level generation component causes a processor to generate a plurality of levels for each of the primary index raster files. A combination index component causes a processor to generate a combination vegetation index (CVIPP) raster file based on a highest level of the GBI and PGI raster files. A map component causes a processor to generate a corn soybean map (CSM) raster file based on the CVIPP raster file. A storage component causes a processor to store the CSM raster file in a memory, and a display component causes a processor to transmit a CSM report to a display device, wherein the CSM report is based on the CSM raster file.

BRIEF DESCRIPTION OF THE DRAWINGS

The embodiments described herein may be better understood by referring to the following description in conjunction with the accompanying drawings.

DETAILED DESCRIPTION

Figure 1:
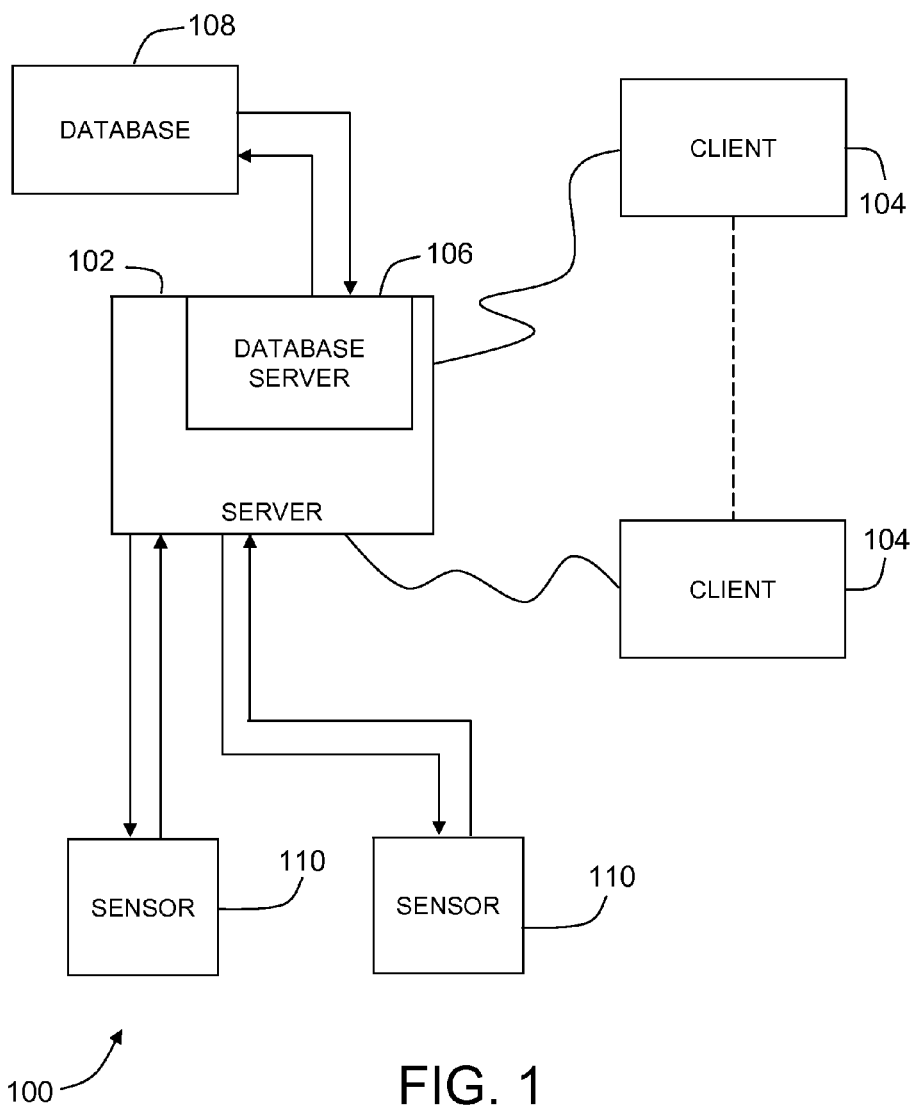
FIG. 1 is a simplified block diagram of an exemplary information system for use in gathering and processing agricultural information.

In some embodiments, the term "remote sensing" (RS) refers generally to a non-destructive process of gathering information about an object or area of interest using an electromagnetic sensor or data collection device, while the sensor or device is not in direct physical contact with the object or area. Typical examples of agriculturally significant RS data sources include those collected by cameras on earth-orbiting satellites and aircraft. Numerous kinds of electromagnetic sensors can be used in RS applications, include sensors which collect information about absorbed or reflected electromagnetic radiation, for example, in a single spectral bands, in several multispectral bands, in many hyperspectral bands, in the visible-light region, in the near-infrared region, in the middle-infrared region, in the far-infrared region, and/or in the microwave region.

In some embodiments, the term "multispectral" (MS) refers generally to a kind of RS system that uses two or more spectral bands. Common RS spectral bands and codes are listed later.

In some embodiments, the term "bandwidth" ($\Delta\lambda$) refers generally to a range of wavelengths ($\lambda$, in nanometers, nm) that are often associated with a specific named spectral band on an RS imager.

In some embodiments, the term "raster" refers generally to a regular array of "digital numbers" (DNs) with locations specified by a pair of line and column coordinates. Each raster element (a.k.a., pixel) has a single DN value. A raster may be a standalone raster file, e.g., a Tagged Image Format File (TIFF) or a geographic TIFF file (GeoTIFF file—extension: .tif). Or, in the "custom-off-the-shelf" (COTS) TNTmips software (licensed by MicroImages, Inc., in Lincoln, Nebr.), a raster can be a raster object inside of an .rvc file (where "rvc" means "raster, vector, CAD"). Some pixels in a raster may have a null value, e.g., 0, to mark pixels that should be ignored or that lack an image-related brightness or information unit.

In some embodiments, the term "image raster" refers generally to a raster that has image-brightness-related DNs that usually range from 1 to 255 (for 8-bit unsigned integer images) or from 1 to 65,535 (for 16-bit unsigned integer images). An image-raster value of 0 (the null-value for a raster) is usually reserved for those pixels in the image raster that have no brightness-related DN value. Usually, there is one image raster for each spectral band.

In some embodiments, the term "spectral Bands and codes" refers generally to a set of MS images consisting of a number of spectral-band images that are individual image rasters. In the embodiments described herein, each spectral band is designated a two-letter spectral-band code, as follows:

CB: Coastal-blue-light band: For wavelengths near 440 nanometers (nm)
BL: Blue-light band: For wavelengths near 485 nm
GL: Green-light band: For wavelengths near 550 nm
YL: Yellow-light band: For wavelengths near 610 nm
RL: Red-light band: For wavelengths near 680 nm
RE: Red-Edge band: For wavelengths near 715 nm
NA: Near-infrared band A: For wavelengths near 830 nm
NB: Near-infrared band B: For wavelengths near 920 nm
MA: Middle-infrared band A: For wavelengths near 1,200 nm
MB: Middle-infrared band B: For wavelengths near 1,650 nm
MC: Middle-infrared band C: For wavelengths near 2,235 nm
TA: Thermal-infrared band A: For wavelengths near 3,500 nm
TB: Thermal-infrared band B: For wavelengths near 10,000 nm In some embodiments, the term "georeferenced raster" refers generally to a raster that has a pair of map coordinates associated with each pixel. Map coordinates are provided by equations that relate each line and column position to a pair of map coordinates (e.g., longitude and latitude or easting and northing) in a stated map projection, datum (e.g., WGS84), and units (e.g., decimal degrees or meters).

In some embodiments, the term "information raster" refers generally to a raster that has DNs that relate to specific information indicators (called index values) or to specific information units (called measurement values with implied measurement units). Null-valued pixels are usually indicated by a 0 or by 255. Thus, actual information units use DNs that range from 1 to 254.

In some embodiments, the term "co-registered rasters" refers generally to a set of image rasters or of information rasters with pixels that relate well to each other, but not necessarily to correct map locations. Co-registered rasters are subject to manipulation by mathematic and/or logical rules that involve the DNs in the co-registered rasters in order to derive additional kinds of information (that often is then placed in a new information raster).

In some embodiments, the term "orthorectified raster" refers generally to a raster where the pixels relate well to map locations (i.e., that have precise geographic coordinates in a declared map projection system).

It should be understood by one of ordinary skill in the art that any raster file may be displayed using, for example, grayscale or color. Moreover, a grayscale display may be based on a predetermined pixel value scale such that a pixel value within a particular range may be displayed using a predetermined shade of gray. Similarly, a color display may be based on a predetermined pixel value scale such that a pixel value within a particular range or having a particular value may be displayed using a predetermined shade of a single color or may be displayed using a color unique to that range of pixel values or to that particular pixel value.

In some embodiments, the term "RGB Display" refers generally to a set of three selected image rasters that are assigned to primary display colors called Red (R), Green (G), and Blue (B).

In some embodiments, the term "color infrared (CIR)" refers generally to an RGB display where three image rasters, namely, NA, RL, and GL, are assigned to R, G, and B dots, respectively, using contrast-enhancement lookup tables. In a false-color CIR image, dense vegetation has saturated reddish colors.

In some embodiments, the term "natural color" (NC) refers generally to an RGB display where three image rasters, namely, RL, GL, and BL, are assigned to R, G, and B dots, respectively, using contrast-enhancement lookup tables. In a true NC image, dense vegetation has different hues as would be observed by a person having normal color vision.

In some embodiments, the term "color infragreen" (CIG) refers generally to an RGB display where three image rasters, namely, MB, NA, and RL, are assigned to R, G, and B dots, respectively, using contrast-enhancement lookup tables. In a false-color CIG image, dense vegetation generally has saturated greenish colors. CIG can also be useful for recognizing snow from clouds.

In some embodiments, the term "contrast-enhancement lookup table" refers generally to a one-to-one lookup table that relates a pixel's DN value to the displayed pixel's brightness (R, G, and/or B brightnesses in an RGB display). These kind of on-the-fly conversions allow one to keep DN values in a raster unchanged while greatly improving how the raster looks when displayed.

In some embodiments, the term "information-extraction algorithm" (IEA) refers generally to a series of complex processing steps that produces one or more specific information rasters from a set of MS image rasters through the use of hierarchal logic operations or mathematical formulas. The information rasters may or may not be georeferenced rasters or orthorectified rasters.

In some embodiments, the term "basic information raster" refers generally to an information raster that represent a particular named type of generic biophysical property as represented by indicator values (i.e., raster DNs) that are associated with each pixel.

In some embodiments, the term "basic information product" refers generally to a basic information raster that has been exported to one of the common, exchange raster file formats, e.g., a GeoTIFF file (.tif).

In some embodiments, the term "vegetation index (VI) value" refers generally to a numeric indicator of relative levels of biomass density (or leaf area index: LAI) usually presented as integer values in an information raster. Over the long history of RS, many formulas and IEAs have been devised to produce a VI raster. Often, the VI values in a VI raster will have a value of 0 or 100 to indicate that no vegetation is present (e.g., in a bare soil field). For some VI rasters, bare soil does not have a value close to 0—rather the bare-soil related VI value might be a non-logical value (neither 0 nor 100). High VI values relate to the densest of vegetation canopies. How a VI value actually relates to a given biophysical measure of biomass density usually varies from vegetation type to vegetation type and even from hybrid to hybrid. Some VI IEAs are susceptible to variations in the reflectance of background soils, called "soil noise" (SN). Others show a muted response to changes in biomass density at the top of the VI scale, called information saturation. In general, VIs are affected by changes in canopy leaf angles and the mixture of leaves with stalks. Leaf pigmentation also affects the VI values made from most VI IEAs.

In some embodiments, the term "calibration" or "calibrated" refers generally to numeric index values that are consistent from image to image and from date to date in terms of, for example, biophysical properties. A number of calibration methods may be used. In the embodiments described herein, the following methods may be used to calibrate, for example, VI pixel values:

In one method, calibrated (i.e., valid) reflectance RF values are used as input. Calibrated RF inputs lead to the same output VI values (be this 0.2 to 0.9, e.g., for NDVI, for vegetation having normal ranges of density or 0 to 100 for VIs generated using other methods). The implication is that using calibrated inputs will yield calibrated outputs. If the input RFs values are valid, and like other RFs that have been produced from other imagery or on other dates, then the resulting VIs will be consistent from place to place or from date to date. A major problem in remote sensing is that it is difficult, if not impossible, to create valid RF values especially with regard to surface-level (SFC) RFs. Top-of-the-atmosphere (TOA) RFs are easy to come by but differ greatly from SRF RFs in ways that depend on un-measureable atmospheric parameters and irradiance differences between attenuated direct sun and indirect scattering from the rest of the hemispherical atmosphere.

In another method, two or more raw VI values are mathematically tied to two or more known biophysical parameters of interest, such as vegetative density conditions, to create a mathematical model that converts the raw VI values to calibrated measures of biophysical parameters of interest. Historically, scientific instruments and their data have been calibrated to standard values by using two or more tie points along the initial numeric scale. For example, a common way to calibrate a thermometer would be to immerse the thermometer in an ice-water bath (which has a known temperature of 0° C.) and then in a boiling-water bath (which has a known temperature of 100° C.). Assuming the raw thermometer readings to be linear between these two known-temperature points provides the means to convert any raw thermometer reading to a calibrated temperature value. This kind of two-point calibration of a VI can be done by, for example, using a known bare-soil area and its raw VI value as a zero GBD point and using a dense vegetation area and its raw VI value as a 100 GBD point, or as an actual GBD value that has been independently measured in the field concurrently with the image collection.

In another calibration method, a range of raw input DN or of transformed intermediate index values are examined in a univariate way, and extreme values are selected (e.g., the cumulative 0.1% and 99.9% points as representing a set output scale). In some cases, univariate distributions can have meaningful extreme values with some attention given to noisy values at these extreme ends.

In yet another method, original spectral brightness values or reflectance values, at TOA or at SFC, are converted to standard indicators of brightness, greenness, yellowness, wetness, and/or any other suitable indicators such that the resulting transformed variables may be calibrated to a given set of biophysical conditions on a transformed variable. Transformation methods included in the embodiments described herein facilitate improved performance of a typical computer method for MS data transformation.

In another calibration method, VI pixel values are tied to biophysical conditions that may not be directly related to the spectral data. Such biophysical conditions may include, without limitation, stand counts, yield distributions, and labeling of pixels that have been organized into clusters of like VI values. This often involves supervised or unsupervised clustering analyses that find scene objects having self-consistent spectral properties but that have no deductive identification. Ground truth then is used to identify certain clusters. Other pixels that belong to the same cluster class than are assumed to be the same as the class indicated by the available ground truth. Clustering does not require absolute input indicators as the rule of membership in a given cluster is based on relative values. Then, each spatial cluster is assigned a biophysical meaning by means of a name or label, such as, "normal," "insect infestation," "nitrogen stressed," and "drought stricken." In fact, non-linear VIs can still be clustered in groups that are related to similarity to neighboring pixels in a mathematical or spatial context. Moreover, more than one of the above methods may be used simultaneously and/or consecutively. The above calibration methods are for illustrative and exemplary purposes and it should be realized that the calibration methods are to be selected according to the circumstances, and may include other methods known in the art and/or combinations of various methods.

Technical effects of methods, systems, and computer-readable media described herein include at least one of (a) receiving a plurality of raster files that relate to an area of interest (AOI); (b) generating a plurality of primary index raster files; (c) generating a cloud mask raster file based on two of the primary index raster files; (d) generating a first level of each of the primary index raster files based on the cloud mask raster file; (e) generating a second level of each of the primary index raster files; (f) generating a third level of each of the primary index raster files based on the second level raster files and supplemental AOI raster files; (g) generating a fourth level of each of the primary index raster files based on the third level raster files and an area of validity mask raster file; (h) generating a plurality of pure-pixel raster files based on the fourth level raster files and a pure-pixel mask raster file; (i) generating a combination vegetative index raster file; (j) generating a corn soybean map raster file based on the combination vegetative index raster file; (k) storing the corn soybean raster file in a memory; (l) creating a corn soybean map report based on the corn soybean raster file; and (m) displaying the corn soybean map report using a client system.

FIG. 1 is a simplified block diagram of an exemplary system 100 in accordance with one embodiment for use in gathering and processing agricultural information. In the exemplary embodiment, system 100 includes a server system 102, and a plurality of client sub-systems, also referred to as client systems 104, connected to server system 102. In one embodiment, client systems 104 are computers including a web browser and/or a client software application, such that server system 102 is accessible to client systems 104 over a network, such as the Internet and/or an intranet. Client systems 104 are interconnected to the Internet through many interfaces including a network, such as a local area network (LAN), a wide area network (WAN), dial-in-connections, cable modems, wireless modems, and/or special high-speed Integrated Services Digital Network (ISDN) lines. As described above, client systems 104 may be any device capable of interconnecting to the Internet including a computer, web-based phone, personal digital assistant (PDA), or other web-based connectable equipment. A database server 106 is connected to a database 108 containing information on a variety of matters, such as agricultural information relating to one or more areas of interest (AOIs). In one embodiment, centralized database 108 is stored on server system 102 and is accessed by potential users at one of client systems 104 by logging onto server system 102 through one of client systems 104. In an alternative embodiment, database 108 is stored remotely from server system 102 and may be non-centralized.

Moreover, in the exemplary embodiment, system 100 includes one or more remote sensors 110. Each sensor 110 gathers information about an object or area of interest, while sensor 110 is not in direct physical contact with the object or area. In one embodiment, sensor 110 is a camera coupled to an earth-orbiting satellite or to an aircraft. In an alternative embodiment, sensor 110 is an electromagnetic sensor that collects information about absorbed or reflected electromagnetic radiation, for example, in a single spectral bands, in several multispectral bands, in many hyperspectral bands, in the visible-light region, in the near-infrared region, in the middle-infrared region, in the far-infrared region, and/or in the microwave region. In some embodiments, sensor 110 is constrained by, for example, server system 102, to use only predetermined look-down angles during data collection and/or to collect data during specified times of day. The times of day during which data is to be collected may be determined by, for example, the day of the year and/or the latitude of the AOI. More specifically, sensor 110 is constrained to only collect data that is not affected by bidirectional reflectance. In the exemplary embodiment, server system 102 accesses each sensor 110 over a network, such as the Internet and/or an intranet. In some embodiments, sensors 110 are also accessible by client system 104 over a network, such as the Internet and/or an intranet.

As discussed below, agricultural information including rasters, image rasters, and/or georeference rasters are stored within sensors 110 and may be extracted by server system 102 for storage within database 108. Moreover, database 108 may include a time stamp for each datum that has been entered or modified within database 108. Because database 108 may include data extracted from multiple sensors 110, each datum stored within database 108 is marked by an identifier such as a key that corresponds to an AOI that relates to the relevant datum.

The embodiments illustrated and described herein as well as embodiments not specifically described herein but within the scope of aspects of the invention constitute exemplary means for generating an agricultural crop map, such as a corn soybean map, and more particularly, constitute exemplary means for archiving and analyzing agricultural data obtained by sensors 110 and stored in database 108 as image raster files. For example, server system 102 or client system 104, or any other similar computer device, programmed with computer-executable instructions illustrated in FIG. 1 constitutes exemplary means for archiving and analyzing agricultural data obtained by sensors 110 and stored in database 108 as image raster files.

Figure 2:
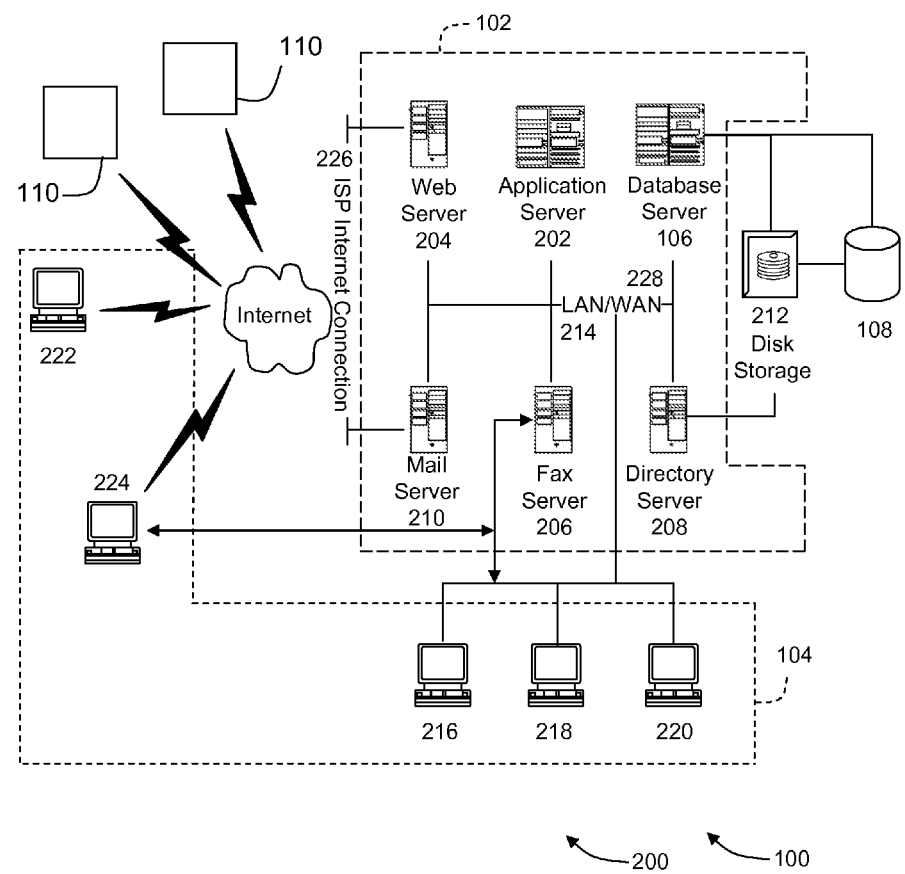
FIG. 2 is an expanded block diagram of an exemplary embodiment of a system architecture of the information system shown in FIG. 1.

FIG. 2 is an expanded block diagram of an exemplary embodiment of a system architecture 200 of system 100 (shown in FIG. 1) in accordance with one embodiment. Components in system architecture 200, identical to components of system 100, are identified in FIG. 2 using the same reference numerals as used in FIG. 1. System 200 includes server system 102 and client systems 104. Server system 102 further includes database server 106, an application server 202, a web server 204, a fax server 206, a directory server 208, and a mail server 210. A disk storage unit 212 is coupled to database server 106 and directory server 208. Examples of disk storage unit 212 include, but are not limited to including, a Network Attached Storage (NAS) device and a Storage Area Network (SAN) device. Database server 106 is also coupled to database 108. Servers 106, 202, 204, 206, 208, and 210 are coupled in a local area network (LAN) 214. Client systems 104 may include a system administrator workstation 216, a user workstation 218, and a supervisor workstation 220 coupled to LAN 214. Alternatively, client systems 104 may include workstations 216, 218, 220, 222, and 224 that are coupled to LAN 214 using an Internet link or are connected through an intranet.

Each client system 104, including workstations 216, 218, 220, 222, and 224, is a personal computer having a web browser and/or a client application. Server system 102 is configured to be communicatively coupled to client systems 104 to enable server system 102 to be accessed using an Internet connection 226 provided by an Internet Service Provider (ISP). The communication in the exemplary embodiment is illustrated as being performed using the Internet, however, any suitable wide area network (WAN) type communication can be utilized in alternative embodiments, that is, the systems and processes are not limited to being practiced using the Internet. In addition, local area network 214 may be used in place of WAN 228. Further, fax server 206 may communicate with remotely located client systems 104 using a telephone link.

Moreover, in the exemplary embodiment, server system 102 is communicatively coupled to one or more remote sensors 110 that acquire data, such as agricultural data. Server system 102 is configured to be communicatively coupled to each sensor 110 to enable server system 102 to access each sensor 110 using Internet connection 226. The communication in the exemplary embodiment is illustrated as being performed using the Internet, however, any suitable wide area network (WAN) type communication can be utilized in alternative embodiments, that is, the systems and processes are not limited to being practiced using the Internet. In addition, local area network 214 may be used in place of WAN 228. Server system 102 is further configured to extract data from each sensor 110 that is specified as a data origin. Server system 102 extracts the data and stores the data within database 108.

Figure 3:
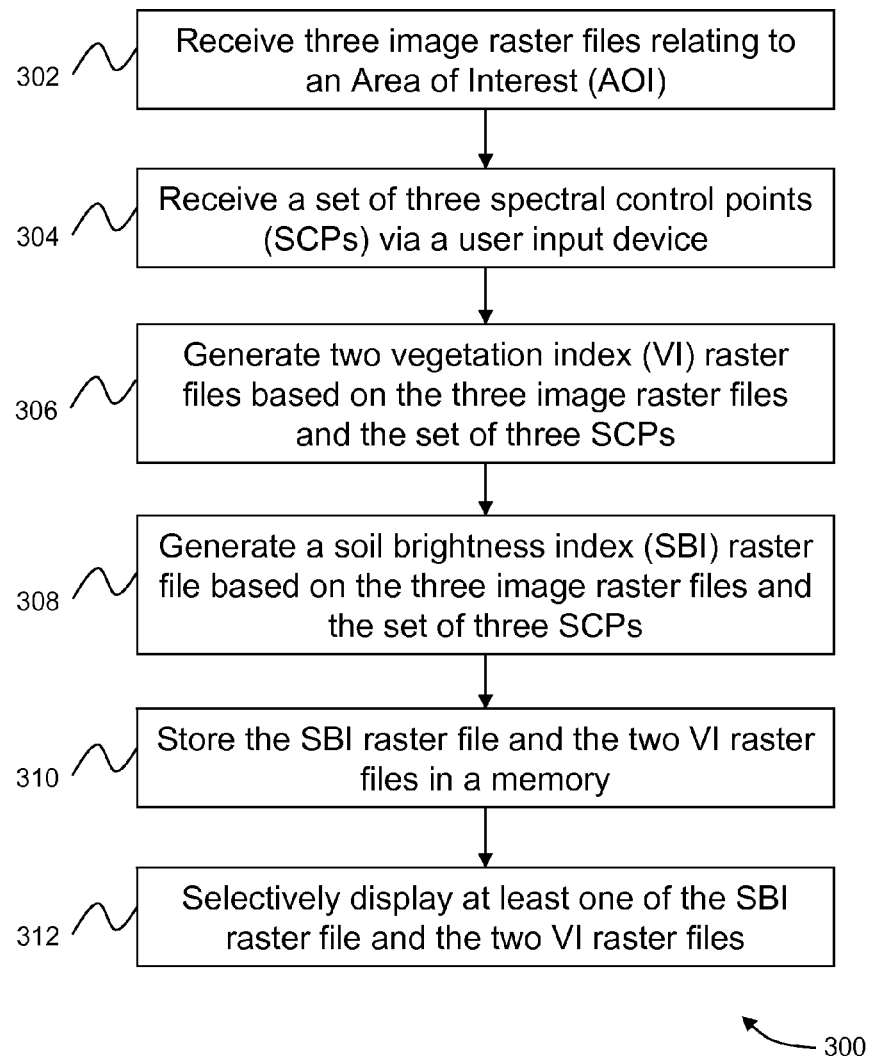
FIG. 3 is a simplified flowchart illustrating an exemplary method for generating basic agricultural information associated with an area of interest (AOI) using the information system shown in FIG. 1.

FIG. 3 is a flowchart 300 that illustrates an exemplary method for generating a plurality of agricultural index raster files associated with an area of interest (AOI) using system 200 (shown in FIG. 2). In the exemplary embodiment, a computer receives 302 three image raster files relating to the AOI from a remote sensing device, such as sensor 110, via a network. Specifically, the computer receives only three image raster files relating to the AOI. In some embodiments, the computer is server system 102. In alternative embodiments, the computer is client system 104. In the exemplary embodiment, the computer includes a memory and a processor coupled via a bus. The computer also includes an input device and a display coupled to the processor. In one embodiment, the computer retrieves the image raster files from sensor 110 by, for example, requesting the image raster files from sensor 110. Alternatively, the computer may receive the image raster files from sensor 110 and store the image raster files in the memory. The computer may then retrieve the image raster files from the memory. In the exemplary embodiment, the computer then receives 304 a plurality of spectral control points (SCPs) from a user via the input device, such as a keyboard or a mouse. Specifically, the computer receives three SCPs from the user. In some embodiments, the computer stores the SCPs in the memory. Moreover, in some embodiments, the computer includes a data reception component that, when executed by the processor, causes the processor to receive and/or retrieve the three image raster files and/or the three SCPs.

In the exemplary embodiment, the computer generates 306 two independent vegetation index (VI) raster files based on the three image raster files and the three SCPs. Specifically, the two VI raster files include a pigmentation index (PGI) raster file and a green biomass index (GBI) raster file. The computer also generates 308 a soil brightness index (SBI) raster file based on the three image raster files and the three SCPs. The computer generates the VI raster files and the SBI raster file by, for example, accessing the three image raster files and the SCPs in the memory, and by processing the image raster files and the SCPs. In some embodiments, the computer includes a primary index component that, when executed by the processor, causes the processor to generate the PGI, GBI, and SBI raster files.

In the exemplary embodiment, the computer then stores 310 each of the SBI, GBI, and PGI raster files in the memory. Moreover, the computer selectively displays 312, via the display, one or more of the PGI, GBI, and SBI raster files. In some embodiments, the computer includes a storage component that, when executed by the processor, causes the processor to store each of the PGI, GBI, and SBI raster files in the memory. Moreover, in some embodiments, the computer includes a display component that, when executed by the processor, causes the processor to selectively transmit one or more of the PGI, GBI, and SBI raster files to the display.

Figure 4:
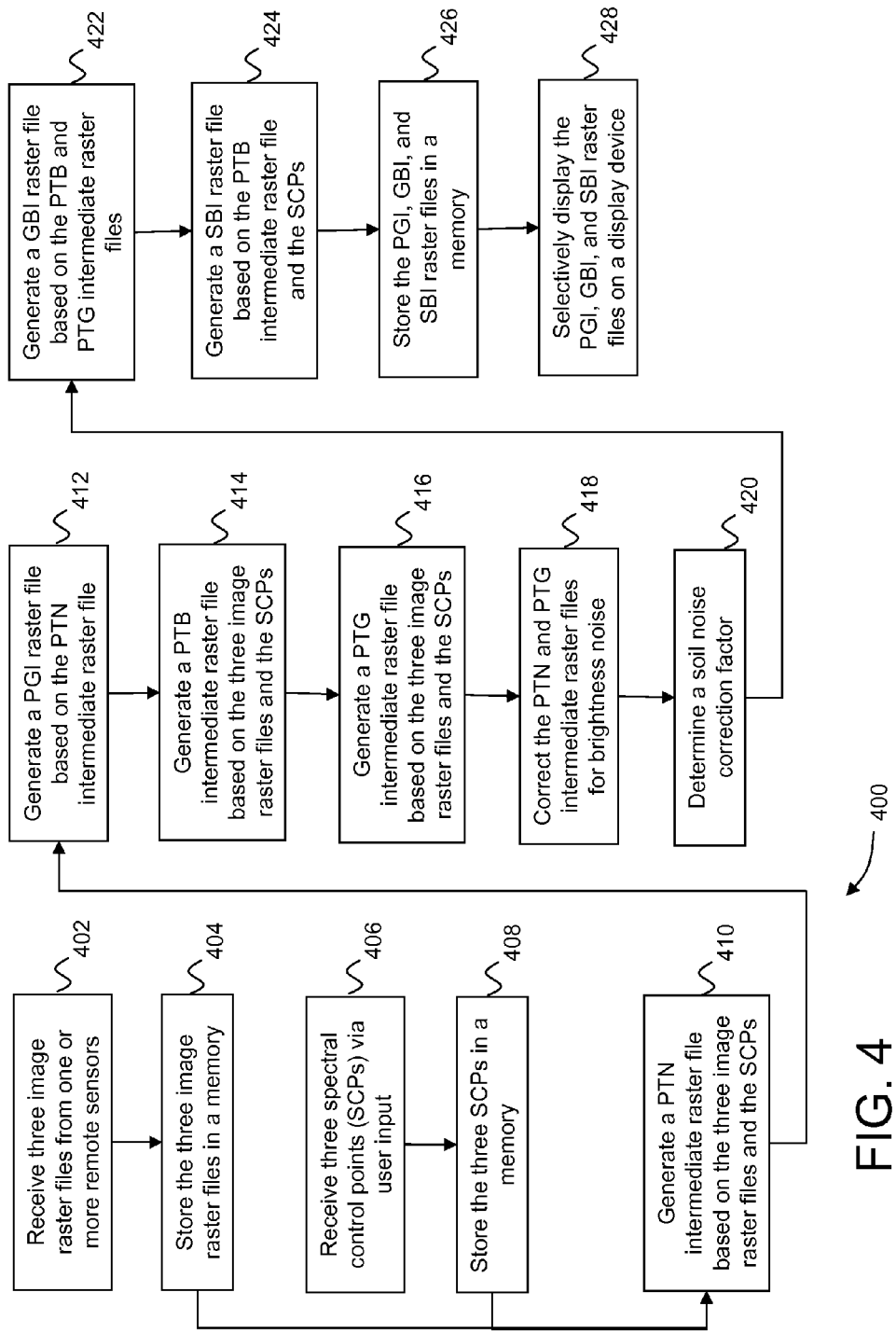
FIG. 4 is an expanded flowchart further illustrating the method shown in FIG. 3.

FIG. 4 is an expanded flowchart 400 further illustrating the method shown in FIG. 3. In the exemplary embodiment, and referring to FIG. 2, server system 102 receives three image raster files from one or more remote sensors 110. Specifically, server system 102 receives 402 the three image raster files from sensors 110 via a network, such as the Internet and/or ISP Internet Connection 226. In the exemplary embodiment, the image raster files are uncalibrated files and include a first image raster file related to the green light spectral band (GL), a second image raster file related to the red light spectral band (RL), and a third image raster file related to the near-infrared, band A spectral band (NA). As such, the three image raster files are orthogonal to each other in a three-dimensional mathematical space. Receiving only the above three image raster files facilitates more consistent output raster files from image to image and date to date. Moreover, each image raster file is a georeferenced raster file and, as such, includes a plurality of pixel values and a set of map coordinates associated with each pixel value. Further, in the exemplary embodiment, none of the three image raster files necessarily includes reflectance factor information. In some embodiments, server system 102 retrieves the three image raster files from sensors 110. In the exemplary embodiment, server system 102 stores 404 the three image raster files in a memory and/or database 108. In one embodiment, client system 104 receives the three image raster files from sensor 110 rather than server system 102. In such an embodiment, client system 104 transmits the image raster files to server system 102 for storage in database 108. Alternatively, client system 104 may store the image raster files locally in a memory.

In the exemplary embodiment, server system 102 then receives 406 a set of three spectral control points (SCPs) via user input. Specifically, a user inputs a location of each of the three SCPs. In the exemplary embodiment, the SCPs include, in the following order, a dark bare soil SCP, a brighter bare soil SCP, and a reference green vegetation SCP. The locations may be input via client system 104, and transmitted to server system 102 via a network, such as the Internet. Alternatively, the locations may be input directly into server system 102. Server system 102 stores 408 each SCP into a memory and/or database 108. In the exemplary embodiment, the SCPs are the only manual input. In alternative embodiments, server system 102 may receive more than three SCPs or less than three SCPs.

Server system 102 then shifts the origin of the original three-dimensional mathematical space defined by the three image raster files. Specifically, server system 102 shifts the origin from a first origin to a second origin that is defined by the three image raster files and the dark bare soil SCP. This pre-rotation shift facilitates reducing the effects of variable path reflectances that occur from scene to scene, i.e. from a first set of data relating to the AOI at a first time to a second set of data relating to the AOI at a second time. Such variable path reflectances are caused by variations in atmospheric haze and/or in solar illumination angles. Moreover, in general a line of bare soils (LBS) passes through a point in the three-dimensional space that is associated with one or more bare soils, such as a dark bare soil. Identification of a second known bare soil point, such as the brighter bare soil SCP, facilitates generating a unit vector in the original three-dimensional mathematical space that defines the LBS as it actually exists in the scene being processed.

In the exemplary embodiment, server system 102 generates three intermediate, open-scale raster files based on the three image raster files and the three SCPs using a progressive transformation (PT) algorithm. A first intermediate raster file is related to brightness, and is hereinafter referred to as a PT brightness (PTB) raster file. A second intermediate raster file is related to greenness, and is hereinafter referred to as a PT greenness (PTG) raster file. A third intermediate raster file is related to biophysical properties other than brightness or greenness, and is hereinafter referred to as PT non-such (PTN). The PT algorithm includes using PT coefficients that may be made one rotational transformation at a time on any number of input features for any number of output PT raster files. For example, applying the PT algorithm to a three-band set as described herein results in three intermediate PT rasters. Each intermediate raster file is a georeferenced raster file and, as such, includes a plurality of pixel values and a set of map coordinates associated with each pixel value. In the exemplary embodiment, the map coordinates of the intermediate raster files match those included in the three image raster files received by server system 102. Moreover, in the exemplary embodiment, the intermediate raster files are calibrated. Calibrating the intermediate raster files enables generating, for example, a PTG raster file with the most dense green herbaceous vegetation in a given scene having pixel values that are related to an output VI that is at or near a highest value of an output VI scale.

Accordingly, in the exemplary embodiment, server system 102 generates 410 the PTN raster file and stores the PTN raster file to a memory and/or database 108. Specifically, pixel values representing a key biophysical object, bare soil, with its various brightness conditions, are set to zero for the PTN raster file. Primary kinds of land-cover materials that have a positive value in the PTN raster file include various densities of residue and some senescing vegetation. Some materials in an imaged scene have PTN values less than zero, such as open water, road materials, rooftops, and some types of vegetation. Server system 102 accesses the stored image raster file and SCP data and generates 412 a first vegetation index (VI) raster file based on the PTN raster file. Specifically, server system 102 accesses the stored PTN raster file and generates a pigmentation index (PGI) raster file based on the PTN raster file by rescaling the raw PTN pixel values into PGI pixel values based on the PTN pixel values that are greater than zero. These positive PTN pixel values relate to residue density on the landscape. After determining a distribution-based highest positive value in the PTN raster file, the effectively highest pixel-value is assigned a PGI value of 50. On the negative side of the PTN scale, the PGI scale is set to $\frac{1}{1.3}$ of the higher side for PGI values greater than 100. The $\frac{1}{1.3}$ ratio enables land-cover types to remain on scale for pixel values between 100 and 254.

The PGI raster file indicates how much the spectral properties in a given pixel depart from the spectral properties of a simple mixture of background bare soil with a typical green vegetation type being in the foreground. These simple-mixture pixels are denoted by PTN values near zero and are assigned a PGI value of 100. There are two types of deviations in pigmentation. A first variation cases a more bluish spectral shift, e.g., deviations caused by deep open water, road surfaces, rooftops, and/or very lush vegetation. A second variation causes a more yellowing spectral shift due to, for example, residue and/or senescing vegetation. The first variation is indicated by PGI pixel values greater than 100 (up to 254). The second variation is indicated by PGI values less than 100 (down to 1). Following generation of the PGI raster file, server system 102 generates 414 the PTB raster file, generates 416 the PTG raster file, and stores the PTB and PTG raster files to a memory and/or database 108. Moreover, server system 102 determines a distribution-based lowest pixel value in the PTG raster file and, on the other side of the PTG scale, the scale is set to $\frac{1}{1.3}$ of the lower side.

In the exemplary embodiment, server system 102 then corrects 418 the PTN and PTG raster files for brightness noise (BN). Specifically, server system 102 accesses and processes the stored PTN and PTG raster files using a ratio-type formula. The corrected PTN and PTG raster files may then be saved to a memory and/or database 108. Moreover, in the exemplary embodiment, server system 102 determines 420 a soil noise (SN) correction factor and applies the SN correction factor to the PTN and PTG raster files.

Server system 102 then generates 422 a second VI raster file based on the PTB and PTG raster files. Specifically, server system 102 generates a green biomass index (GBI) raster file by accessing the stored PTB and PTG raster files in a memory or in database 108, and by determining a plurality of raw GBI pixel values. Server system 102 then calibrates the raw GBI pixel values by applying a scaling factor to the raw GBI pixel values to determine final GBI pixel values. The final GBI pixel values make up the GBI raster file. The GBI raster pixel values indicate how much green biomass density is present in the current scene. Bare soil is represented by a value of 100. Vegetated areas are assigned GBI pixel values greater than 100, up to approximately 200 for very dense planophile herbaceous vegetation. Other land-surface materials are assigned GBI pixel values on a linear scale between and beyond 100 and 200 according to a numeric scale that runs from 1 to 255. Areas in the current scene that are neither soil nor vegetated are assigned GBI pixel values less than 100, down to 1. A GBI pixel value of 0 is used to mark null cells, where are places where imagery was missing or has been masked out. While generating the GBI raster file, server system 102 may store the scaling factor and/or the raw GBI pixel values to a memory and/or database 108.

In the exemplary embodiment, server system 102 then generates 424 a soil brightness index (SBI) raster file based on the intermediate PTB raster file and the three SCPs. Specifically, server system 102 calibrates the PTB pixel values into output SBI pixel values by setting the darkest PTB pixel value to 1 and the 99th percentile PTB pixel value to 200. The calibrated PTB raster file is then used to generate the SBI raster file. The SBI pixel values represent a weighted-average brightness of all three color-infrared (CIR) spectral bands, and is displayed similar to a panchromatic image. Because the SBI raster file represents the brightness of bare soils with some sparse vegetation being present, pixels having non-reference PGI pixel values and positive greenness values are excluded in order to avoid residue-dominated and dense-vegetation pixels which are brighter than bare soils. When generating the SBI raster file, server system 102 may store the SBI offset value and/or the calibrated PTB raster file in a memory and/or database 108.

It should be noted that, in some embodiments, server system 102 receives image raster files from sensors 110 for any three available spectral bands. In such embodiments, when generating the PGI, GBI, and/or SBI raster files, server system 102 adapts a set of non-fixed coefficients based on the three spectral bands that are used.

In the exemplary embodiment, server system 102 stores 426 the PGI, GBI, and SBI raster files in a memory and/or in database 108. Moreover, server system 102 and/or client system 104 then selectively displays 428 the originally received image raster files, the PGI raster file, the GBI raster file, and/or the SBI raster file using a display device. In some embodiments, server system 102 accesses a selected one of the stored PGI, GBI, and SBI raster files stored in a memory and/or in database 108, and transmits the selected raster file to client system 104 for display.

Figure 5:
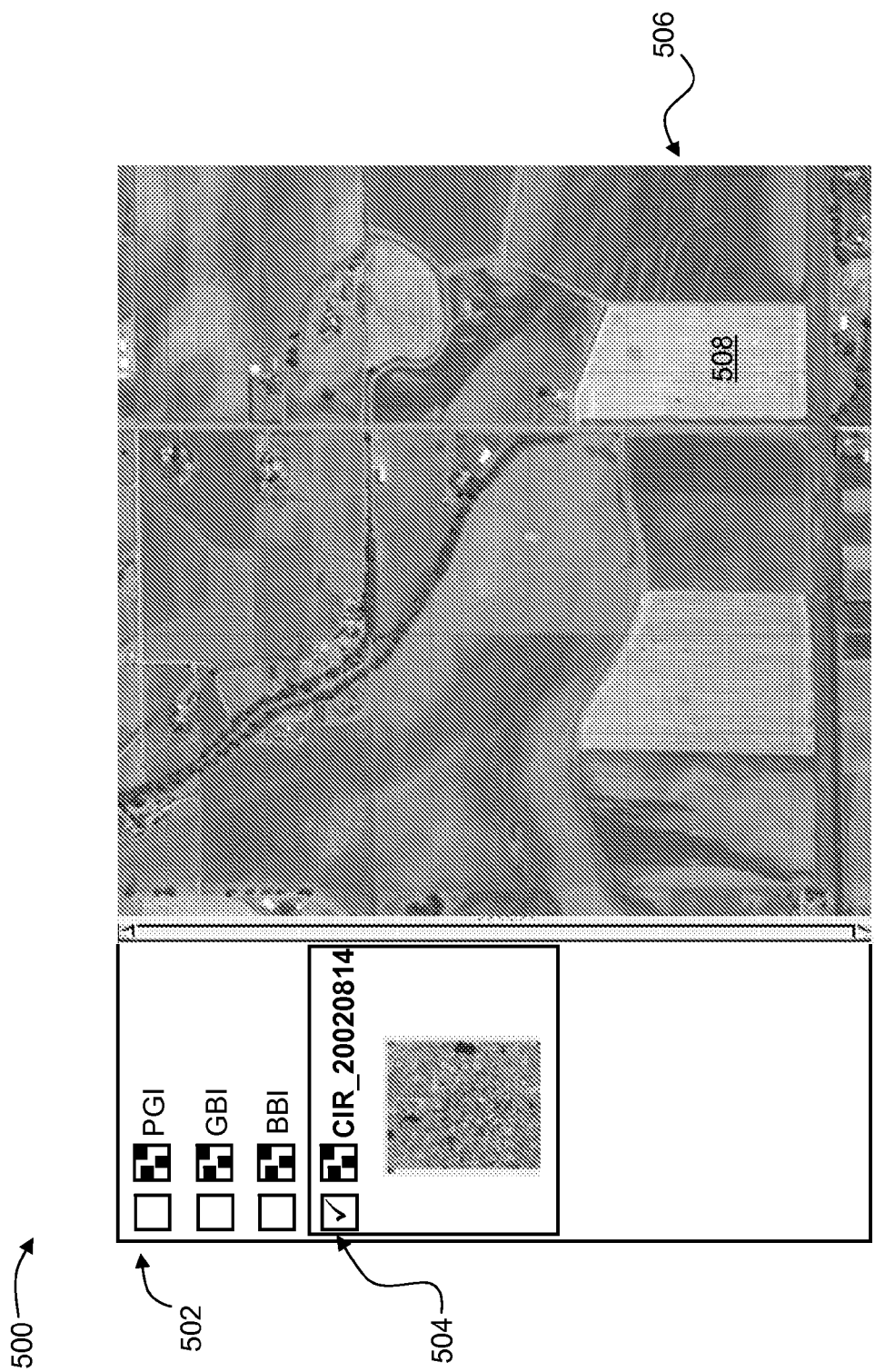
FIG. 5 is an image including three image rasters prior to being processed using the information system shown in FIG. 1.
Figure 6:
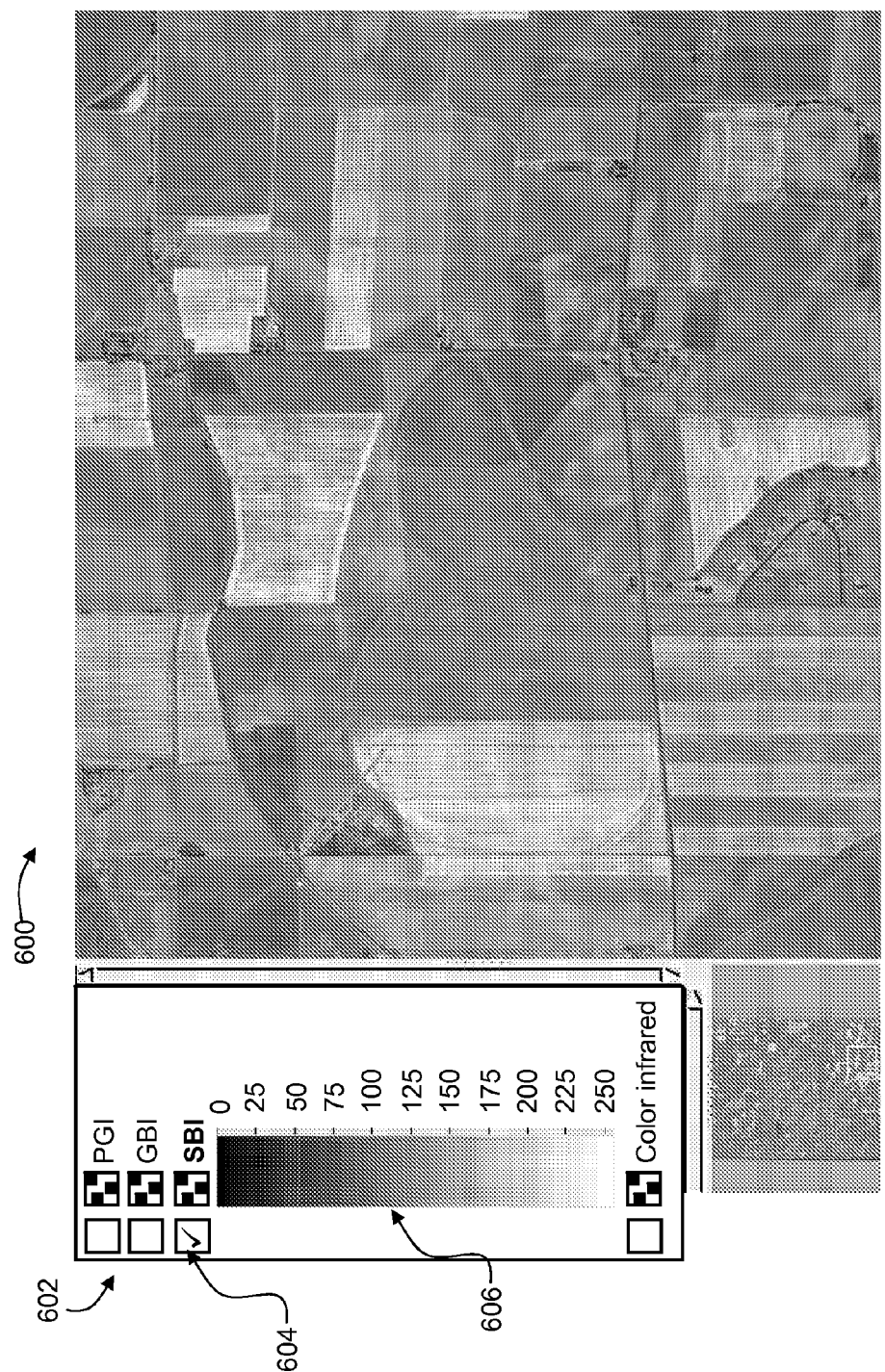
FIG. 6 is a soil-brightness-adjusted image that has been processed using the information system shown in FIG. 1.
Figure 7:
FIG. 7 is a soil-noise-suppressed image that has been processed using the information system shown in FIG. 1.
Figure 8:
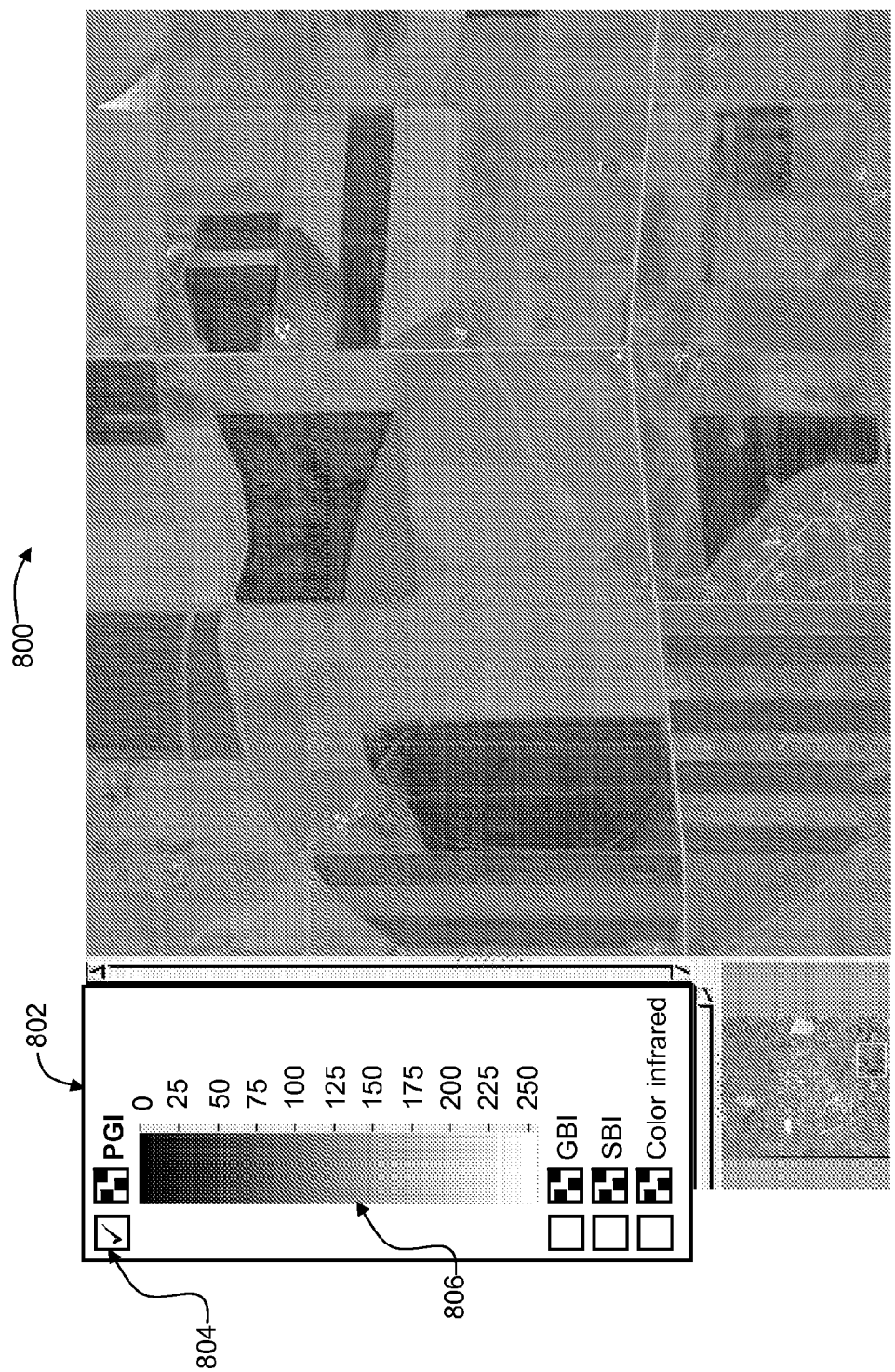
FIG. 8 is a pigmentation-adjusted image that has been processed using the information system shown in FIG. 1.

FIG. 5 is a color infrared (CIR) image 500 that includes the three image raster files received and processed by server system 102. FIGS. 6-8 are exemplary images that have been processed using system 200. Specifically, FIG. 6 is a soil-brightness-adjusted image 600 produced by displaying the SBI raster file; FIG. 7 is a soil-noise-suppressed image 700 produced by displaying the GBI raster file; and FIG. 8 is a pigmentation-adjusted image 800 produced by displaying the PGI raster file. Each image 500-800 includes a selection portion 502, 602, 702, and 802 that enables a user to select the raster file to display. For example, by selecting the CIR raster file 504, the user may display the raw CIR image received by server system 102 from sensors 110. As shown in FIG. 6, by selecting the SBI raster file 604, the user may display the SBI raster file generated by server system 102 as described above. Similarly, as shown in FIG. 7, by selecting the GBI raster file 704, the user may display the GBI raster file generated by server system 102, or as shown in FIG. 8, by selecting the PGI raster file 804, the user may display the PGI raster file generated by server system 102. Images 600-800 are shown using numeric-scale-related set of gray tones.

FIG. 5 illustrates that patterns of darker soils 506 and brighter soils 508 may appear in the AOI. Such patterns may be sources of soil noise. FIG. 6 illustrates that the SBI raster file captures brightness patterns in the AOI, as shown by a brightness key 606. Moreover, FIG. 7 illustrates that the GBI raster file suppresses the soil noise shown in image 500, resulting in cleaner mapping of spatial patterns of green biomass density variations, as shown by a soil brightness key 706. The range of GBI values from 100 to 200 tracks the full range of typical green biomass density present in the AOI, with bare soil having a GBI value of approximately 100 and very dense herbaceous green vegetation having a GBI value of approximately 200. In some embodiments, and due to normal spectral variations among different soil types, the GBI value for bare soils will vary by a few units from the nominal value of 100. Moreover, in some embodiments, and due to canopy structure and leaf-angle variations, dense herbaceous vegetation will have a range of GBI values between 180 and 200. In the exemplary embodiment, non-vegetated and non-soil-land-cover types will have GBI values between 1 and approximately 95. Further, FIG. 8 illustrates that the PGI raster file facilitates displaying useful patterns of pigmentation values where ground residue is dense, as shown by a pigmentation key 806. Moreover, the PGI raster file facilitates mapping non-vegetated, non-soil areas such as roads, open water, rooftops, and the like. In some embodiments, images 500, 600, 700, and/or 800 are displayed using grayscale such that pixel values of each raster file correspond with a predetermined shade of gray. In an alternative embodiment, images 500, 600, 700, and/or 800 are displayed using colors such that pixel values of each raster file correspond with a predetermined color.

Figure 9:
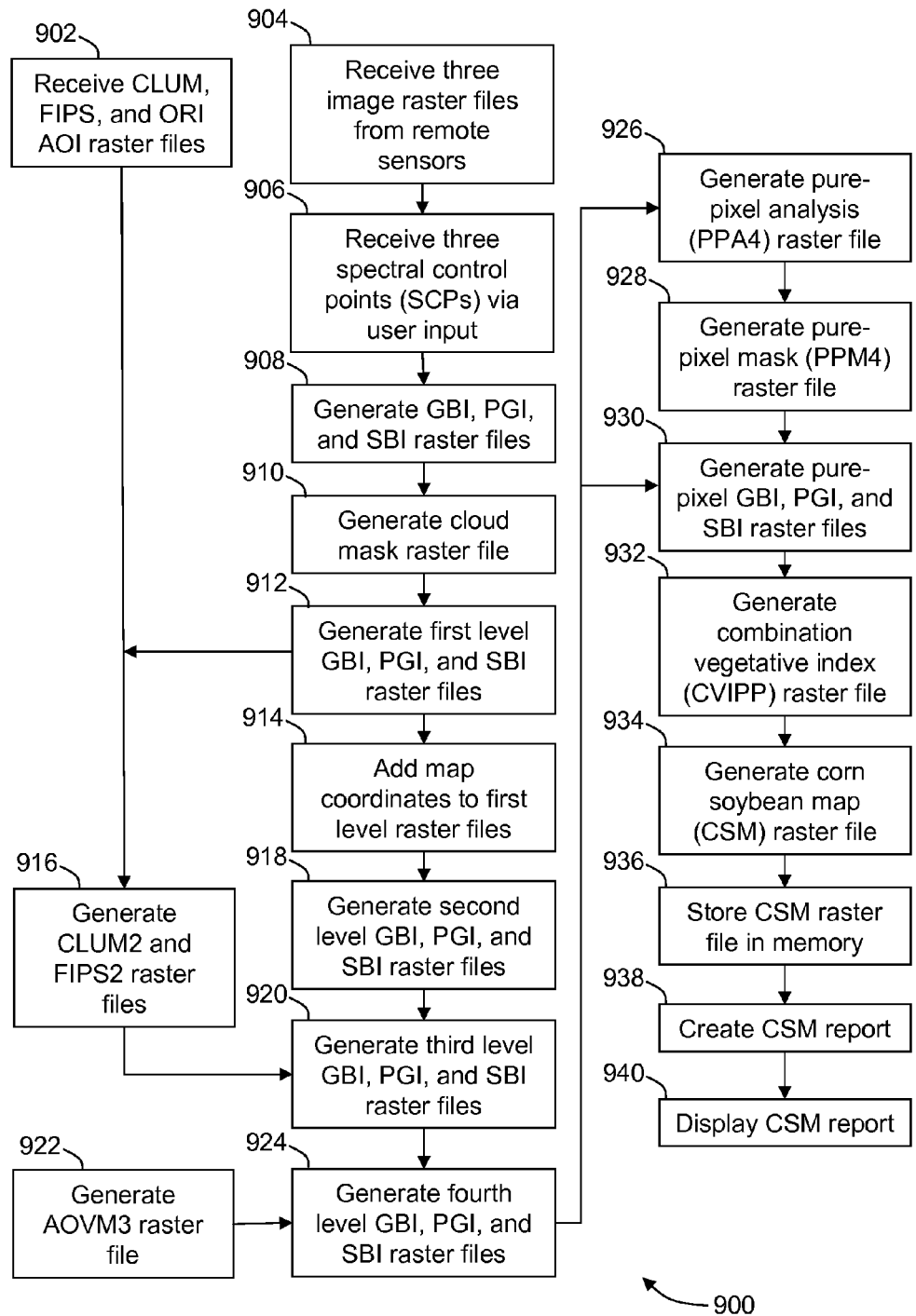
FIG. 9 is a flowchart illustrating an exemplary method for generating additional agricultural information associated with an area of interest (AOI) using the information system shown in FIG. 1.

FIG. 9 is a flowchart 900 that illustrates an exemplary method for generating a raster file and a report based on the raster file using system 200 (shown in FIG. 2) and, more specifically, using server system 102 (shown in FIGS. 1 and 2). In the exemplary embodiment, server system 102 receives 902 a plurality of raster files related to the AOI. Specifically, a user, such as a crop analyst, prepares a plurality of raster files using, for example, client system 104 (shown in FIGS. 1 and 2). The plurality of raster files includes a common land unit mask (CLUM) raster file that covers the entire AOI at a pixel resolution that is appropriate to the MS imagery being processed as discussed above. In some embodiments, the user selects the pixel resolution. Moreover, in some embodiments, server system 102 includes computer-readable storage media having a reception component that causes a processor to receive the AOI raster files. In the exemplary embodiment, the CLUM raster file is formed using common land unit (CLU) polygons for cropland areas as produced by, for example, the Farm Services Agency (FSA) division of the United States Department of Agriculture (USDA). The plurality of raster files also includes a raster that is formed using county polygons based on federal information processing standards (FIPS) codes for each county and state. The FIPS raster file is used to assign a unique FIPS code to each pixel within the AOI.

Figure 10:
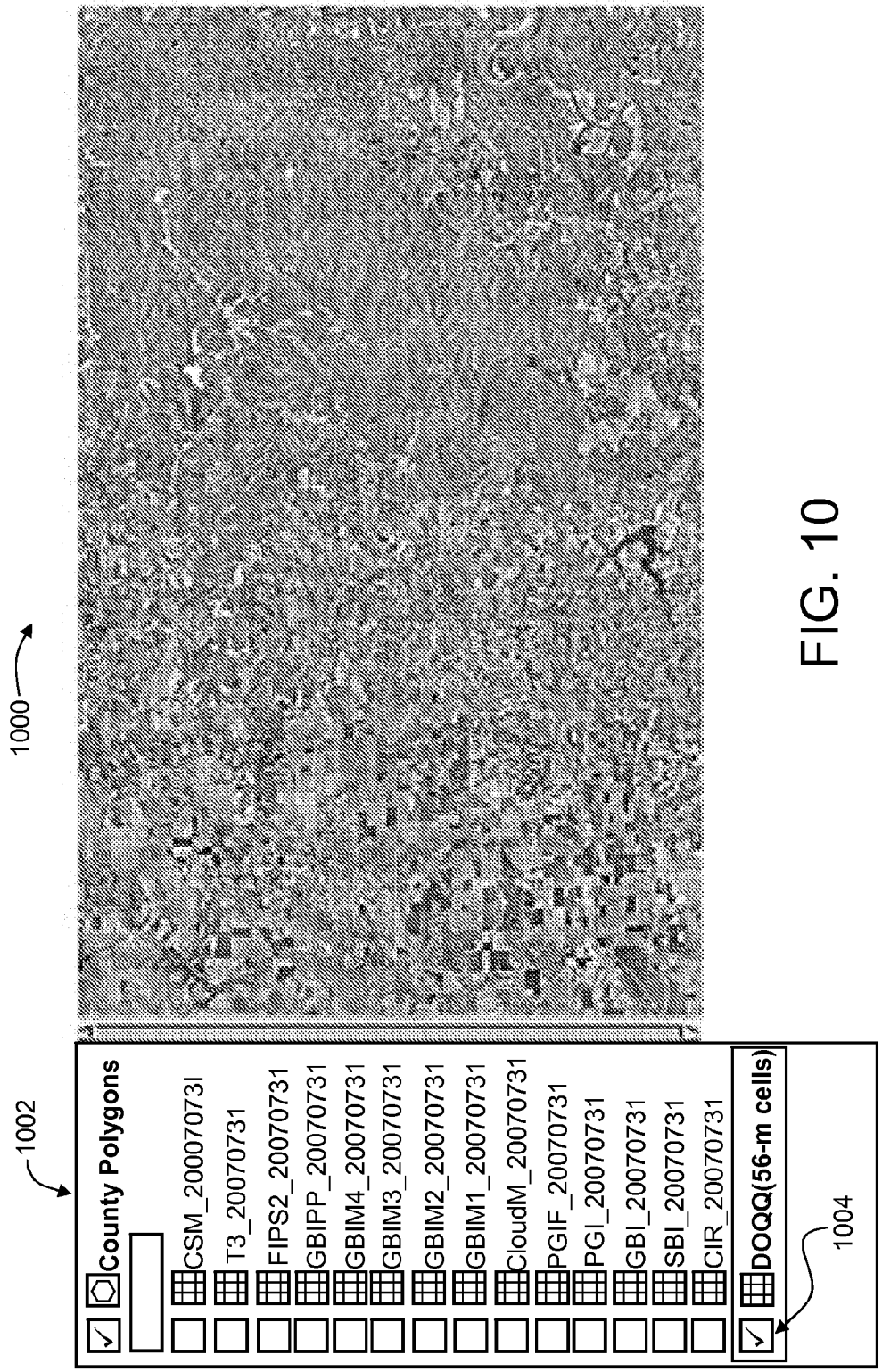
FIG. 10 is an image illustrating display of an orthorectified image used by the information system shown in FIG. 1 to produce an index raster file.

Server system 102 also receives an orthorectified reference image (ORI). The ORI may be grayscale or in color. As an example, the ORI may be a digital orthorectified quarter quad (DOQQ) image. FIG. 10 is an image 1000 produced by displaying the ORI raster file via client system 104. Image 1000 includes a selection portion 1002 that enables a user to select a raster file to display. For example, by selecting the DOQQ raster file 1004, the user may display the ORI raster file received by server system 102 using color or grayscale. Client system 104 transmits each AOI raster to server system 102 via a network, such as the Internet, LAN 214 (shown in FIG. 2), and/or WAN 228 (shown in FIG. 2). Server system 102 then stores each AOI raster in a memory and/or in database 108 (shown in FIGS. 1 and 2).

Figure 11:
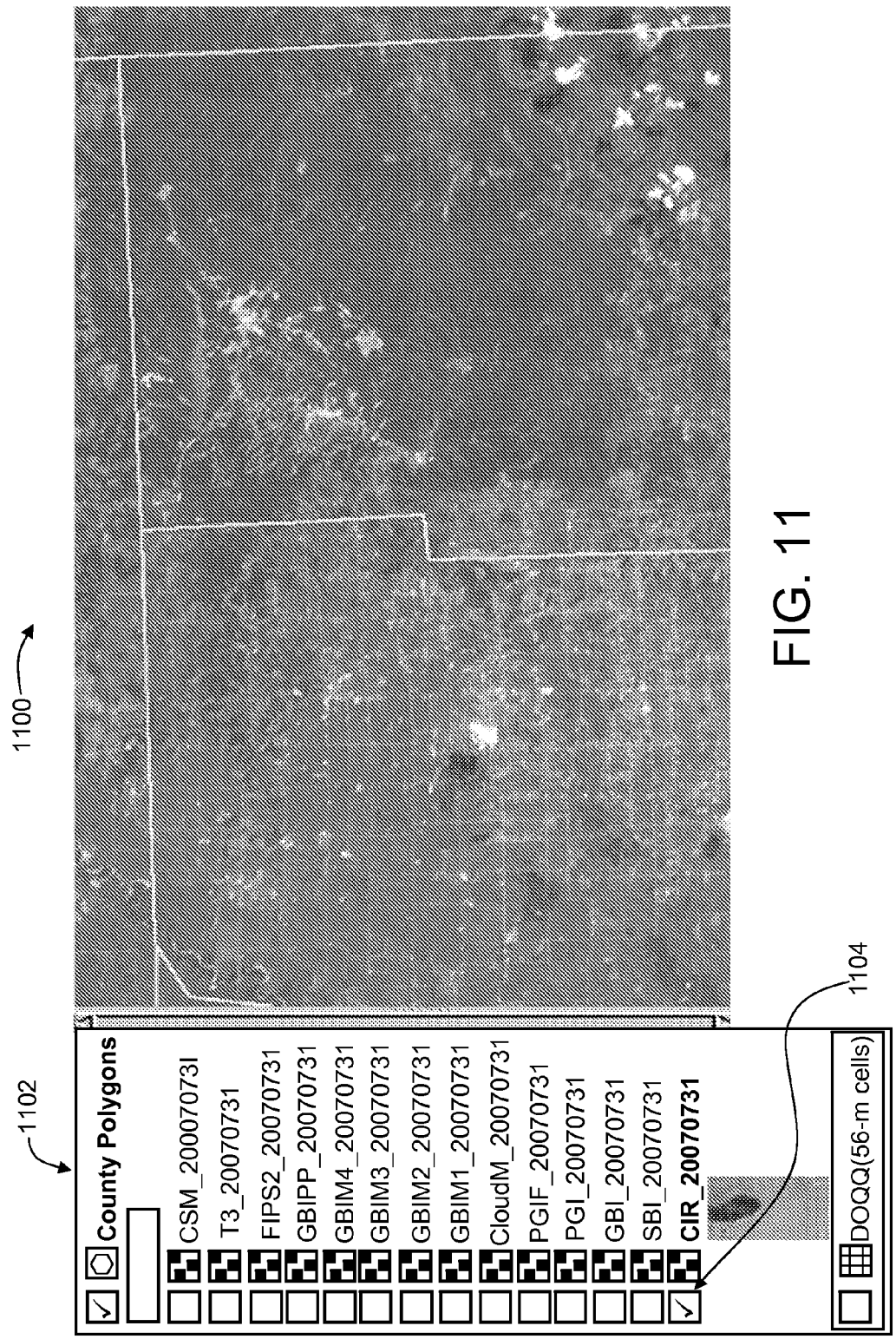
FIG. 11 is an image illustrating display of an image including three image raster files prior to being processed using the information system shown in FIG. 1.
Figure 12:
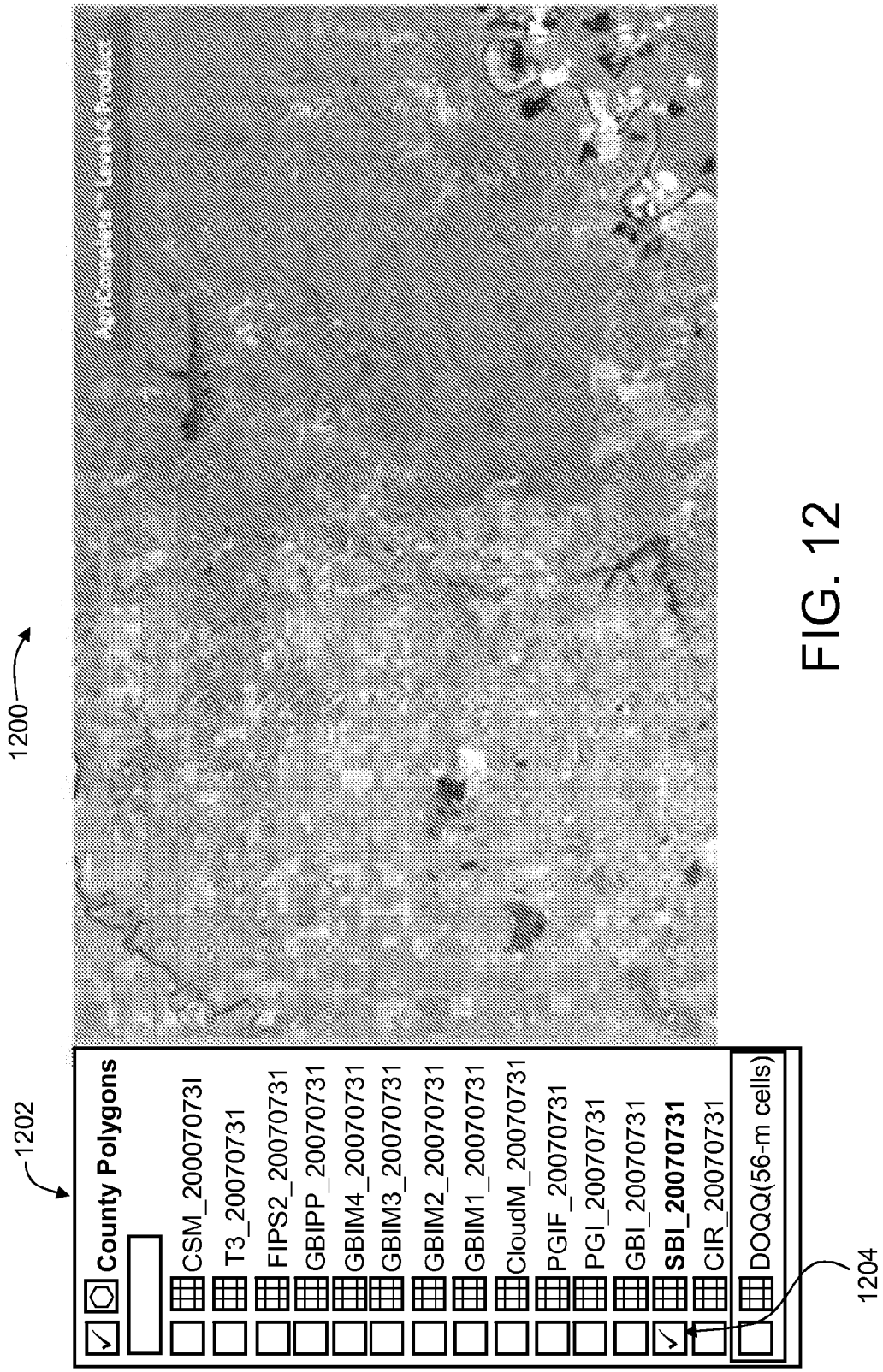
FIG. 12 is an image illustrating display of a soil brightness index raster file that has been processed using the information system shown in FIG. 1.
Figure 13:
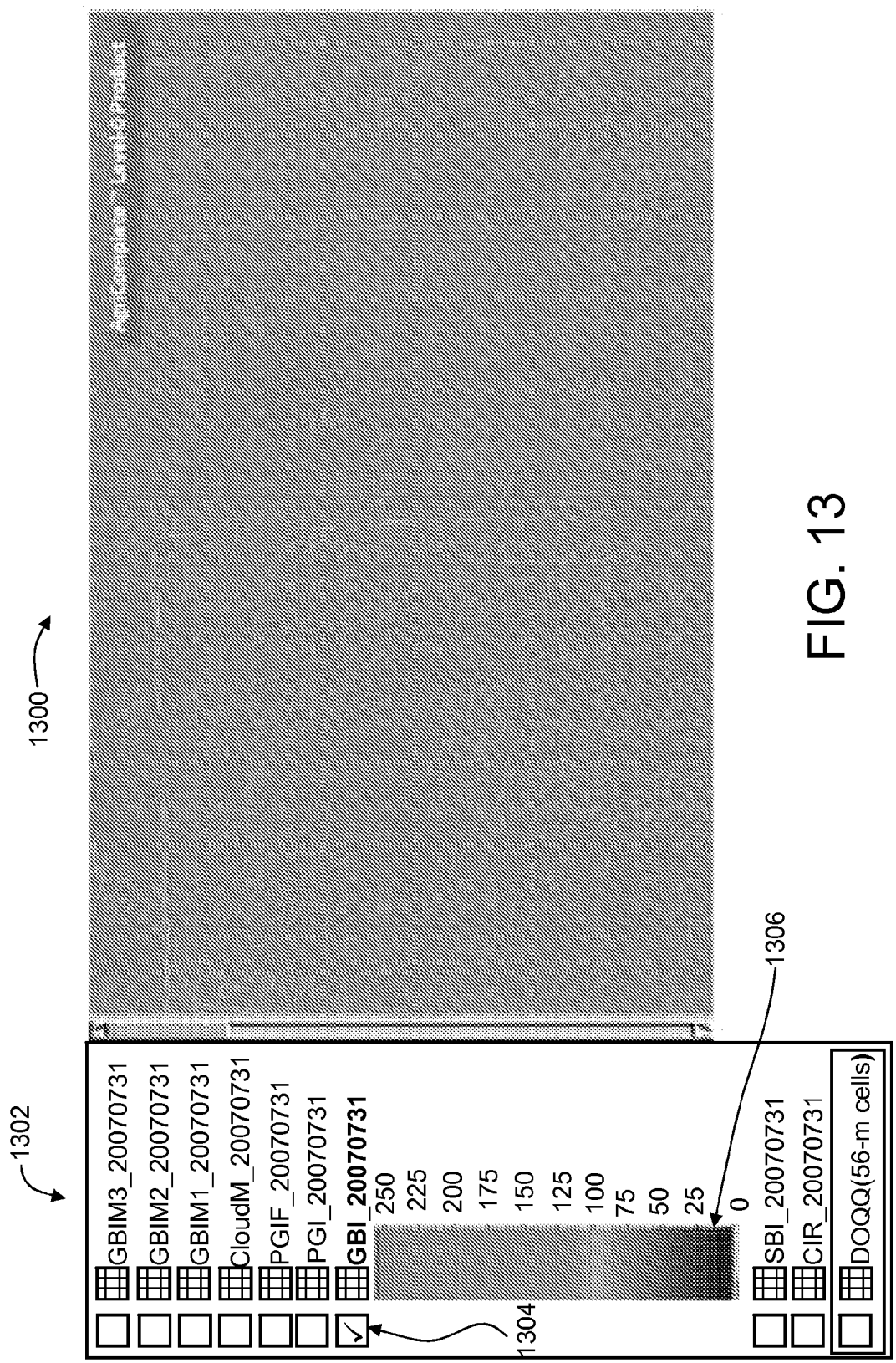
FIG. 13 is an image illustrating display of a green biomass index raster file image that has been processed using the information system shown in FIG. 1.
Figure 14:
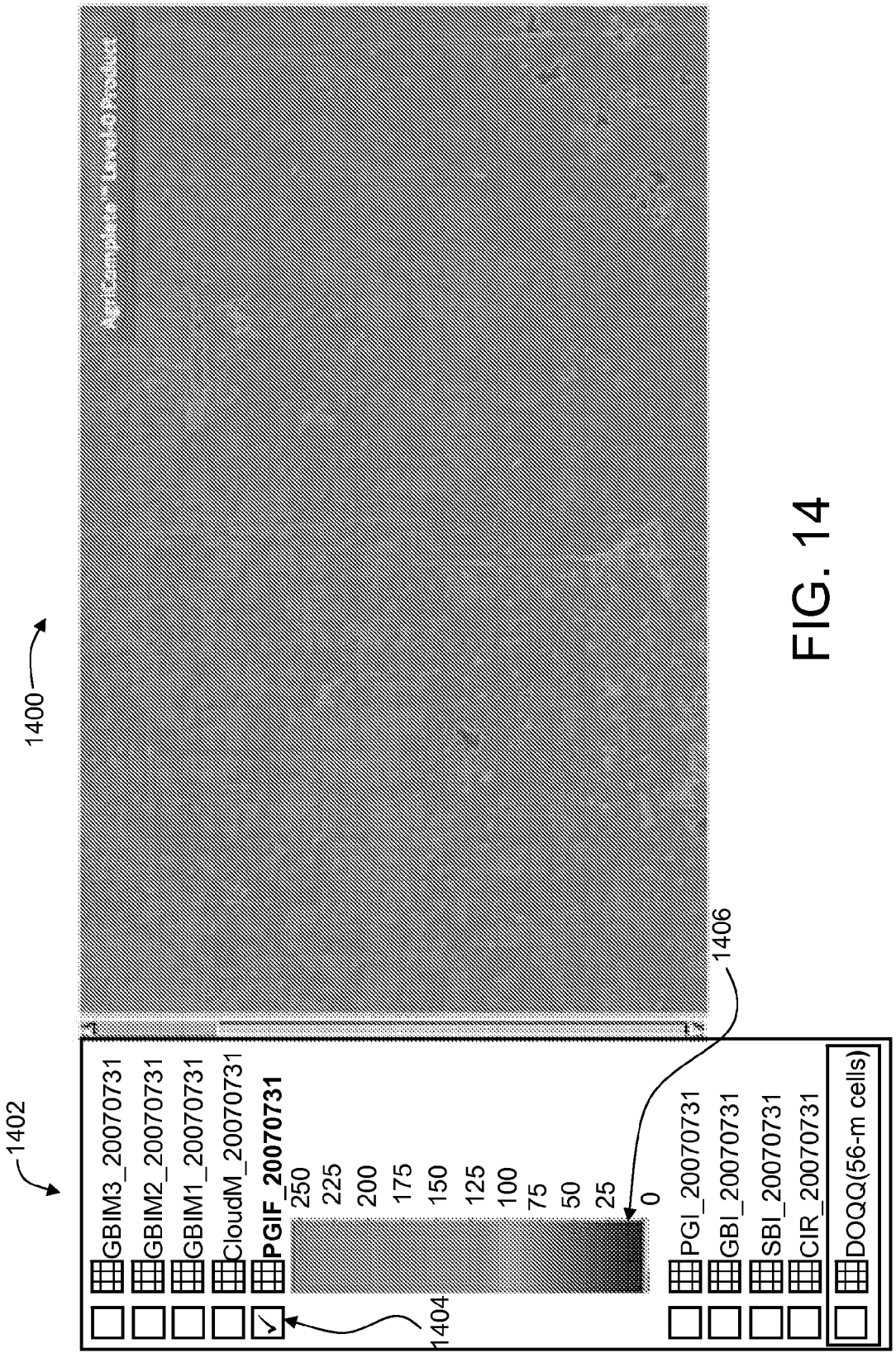
FIG. 14 is an image illustrating display of a filtered pigmentation index raster file that has been processed using the information system shown in FIG. 1.

In the exemplary embodiment, the GBI, PGI, and SBI raster files are generated as described in FIGS. 3 and 4. Specifically, server system 102 receives 904 three image raster files from one or more sensors 110 (shown in FIGS. 1 and 2), and stores the three image raster files in a memory and/or in database 108. In some embodiments, server system 102, for example, includes computer-readable storage media having a primary index component that causes a processor to generate the GBI, PGI, and SBI raster files. FIG. 11 is an image 1100 produced by displaying the three image raster files via client system 104. Image 1100 includes a selection portion 1102 that enables a user to select a raster file to display. For example, by selecting the CIR raster file 1104, the user may display the three image raster files received by server system 102. Moreover, server system 102 receives 906 three SCPs via user input, as described above, and stores the SCPs in a memory and/or in database 108. Server system 102 then generates 908 the GBI, PGI, and SBI raster files based on the three image raster files and the three SCPs, as described in greater detail above. Server system 102 stores the GBI, PGI, and SBI raster files in a memory and/or in database 108. FIGS. 12 and 13 are images 1200 and 1300 produced by displaying the SBI and GBI raster files via client system 104, respectively. Images 1200 and 1300 each include a selection portion 1202 and 1302 that enable a user to select a raster file to display. For example, by selecting the SBI raster file 1204, the user may display the SBI raster file generated by server system 102 using color or grayscale. Similarly, by selecting the GBI raster file 1304, the user may display the GBI raster file generated by server system 102 using a predetermined color or grayscale key 1306. In some embodiments, server system 102 filters the PGI raster file. FIG. 14 is an image 1400 produced by displaying the filtered PGI raster file (PGIF) via client system 104. Image 1400 includes a selection portion 1402 that enables a user to select a raster file to display. For example, by selecting the PGIF raster file 1404, the user may display the PGIF raster file generated by server system 102 using a predetermined color or grayscale key 1406.

Figure 15:
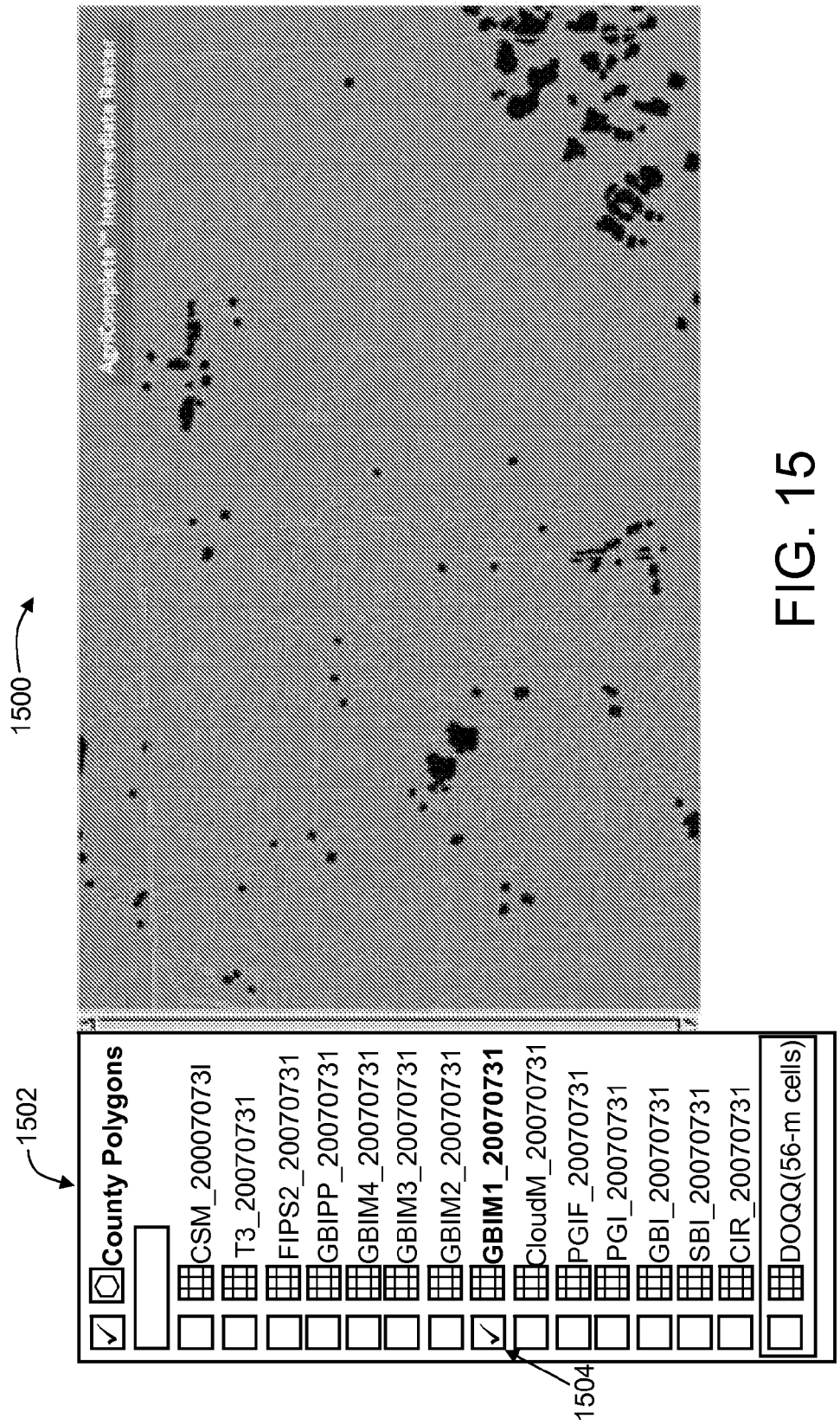
FIG. 15 is an image illustrating display of a first level green biomass index raster file that has been processed using the information system shown in FIG. 1.

Moreover, in the exemplary embodiment, server system 102 generates 910 a cloud mask raster file based on the SBI and PGI raster files, and stores the cloud mask raster file in a memory and/or in database 108. In some embodiments, server system 102, for example, includes computer-readable storage media having a masking component that causes a processor to generate the cloud mask raster file. In the exemplary embodiment, server system 102 then generates a plurality of levels for each of the primary index raster files. Specifically, server system 102 generates 912 a plurality of first level primary index raster files. More specifically, the cloud mask raster file is used to exclude pixels in the GBI, PGI, and SBI raster files that are invalid due to clouds, cloud shadows, and/or variable or thick haze. The resulting raster files are hereinafter referred to as GBIM1, PGIM1, and SBIM1. Server system 102 stores each of the first level raster files in a memory and/or in database 108. FIG. 15 is an image 1500 produced by displaying the GBIM1 raster file via client system 104. Image 1500 includes a selection portion 1502 that enables a user to select a raster file to display. For example, by selecting the GBIM1 raster file 1504, the user may display the GBIM1 raster file generated by server system 102. In some embodiments, a user may similarly display the PGIM1 raster file or the SBIM1 raster file. Moreover, in some embodiments, server system 102, for example, includes computer-readable storage media having a level generation component that causes a processor to generate each of the plurality of levels for each of the primary index raster files. In the exemplary embodiment, server system 102 then adds 914 map coordinates to the GBI, PGI, and SBI raster files using the CLUM and ORI raster files to acquire true geographic locations of the pixel values within the GBI, PGI, and SBI raster files.

In the exemplary embodiment, server system 102 then generates 916 supplemental AOI raster files. Specifically, server system 102 transmits the SBIM1 raster file to client system 104 for display. In the exemplary embodiment, the user selects the smallest portion of the CLUM raster file that covers the extent of the SBIM1 raster file area. In an alternative embodiment, server system 102 automatically detects the smallest portion of the CLUM raster file that covers the extent of the SBIM1 raster file area. In the exemplary embodiment, server system 102 saves this portion as a supplemental CLUM raster file, hereinafter referred to as CLUM2. The same range is then used to extract a portion of the FIPS raster file. Server system 102 saves this portion as a supplemental FIPS raster file, hereinafter referred to as FIPS2. Server system 102 then generates 918 a plurality of second level primary index raster files based on the first level primary index raster files. The resulting raster files are hereinafter referred to as GBI2, PGI2, and SBI2. Specifically, server system 102 resamples the GBIM1, PGIM1, and SBIM1 raster files, and stores the second level primary index raster files in a memory and/or in database 108.

Figure 16:
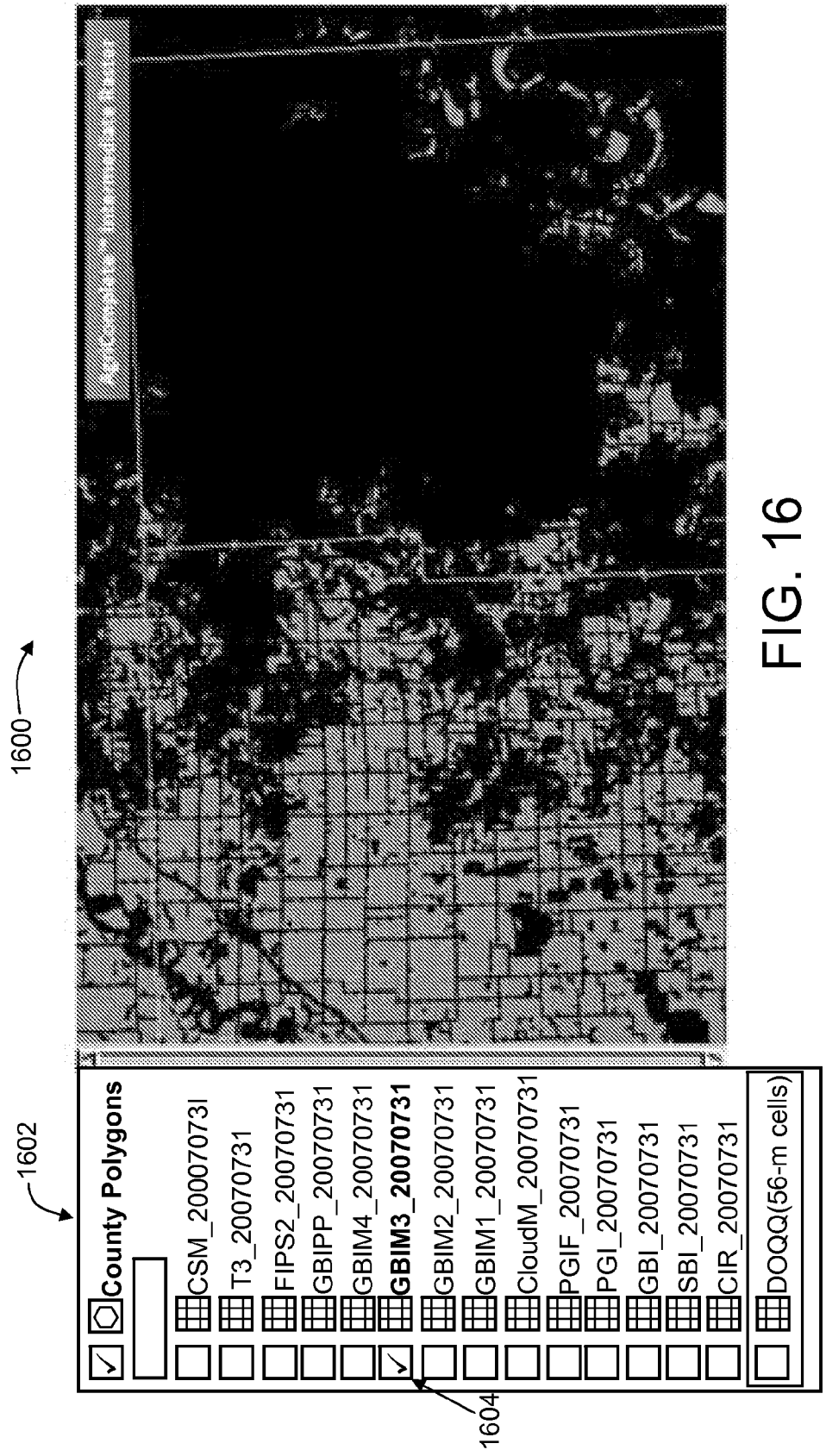
FIG. 16 is an image illustrating display of a third level green biomass index raster file that has been processed using the information system shown in FIG. 1.

Server system 102 then generates 920 a plurality of third level primary index raster files based on the GBI2, PGI2, and SBI2 raster files and on the CLUM2 raster file. Specifically, server system 102 accesses the second level primary index raster files and the CLUM2 raster file in a memory and/or in database 108, and applies the CLUM2 raster file to each of the second level primary index raster files to generate the third level primary index raster files. The resulting raster files are hereinafter referred to as GBI3, PGI3, and SBI3. Server system 102 then stores the third level primary index raster files in a memory and/or in database 108. FIG. 16 is an image 1600 produced by displaying the GBI3 raster file via client system 104. Image 1600 includes a selection portion 1602 that enables a user to select a raster file to display. For example, by selecting the GBI3 raster file 1604, the user may display the GBI3 raster file generated by server system 102. In some embodiments, a user may similarly display the PGI3 raster file or the SBI3 raster file.

Figure 17:
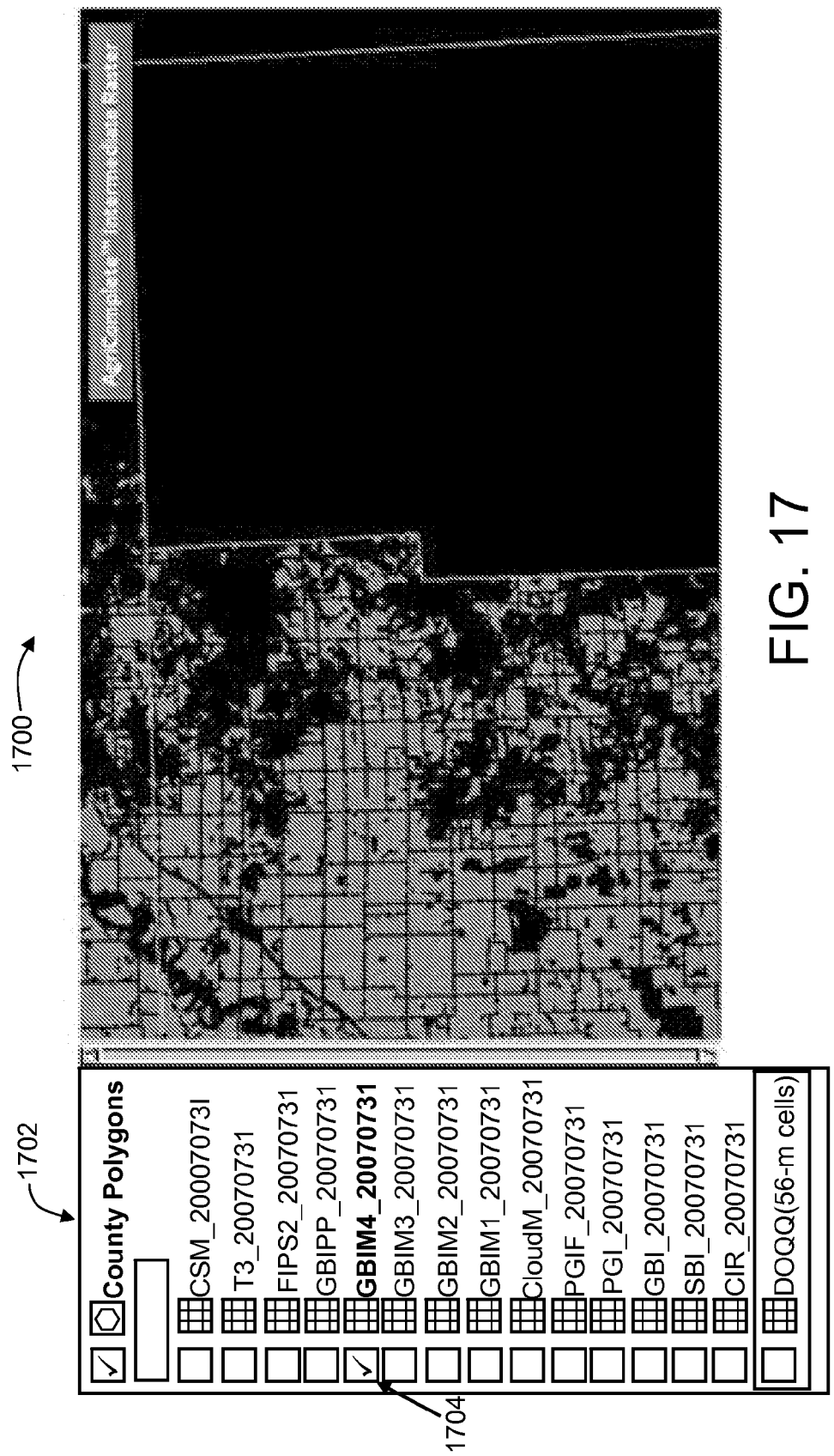
FIG. 17 is an image illustrating display of a fourth level green biomass index raster file that has been processed using the information system shown in FIG. 1.

In the exemplary embodiment, system 200 generates 922 an area of validity mask (AOVM3) raster file. Specifically, server system 102 defines the pixels that are valid for a polygonal-level assessment of crop acreages and/or conditions to generate the AOVM3 raster file, and stores the raster file in a memory and/or in database 108. Moreover, system 200 generates 924 a plurality of fourth level primary index raster files based on the third level primary index raster files and the AOVM3 raster file. Specifically, server system 102 access the third level primary index raster files and the AOVM3 raster file in a memory and/or database 108, and applies the AOVM3 raster file to each of the third level primary index raster file. The resulting raster files are hereinafter referred to as GBI4, PGI4, and SBI4. Server system 102 then stores the fourth level primary index raster files in a memory and/or in database 108. FIG. 17 is an image 1700 produced by displaying the GBI4 raster file via client system 104. Specifically, image 1700 includes a selection portion 1702 that enables a user to select a raster file to display. For example, by selecting the GBI4 raster file 1704, the user may display the GBI4 raster file generated by server system 102. In some embodiments, a user may similarly display the PGI4 raster file or the SBI4 raster file.

Figure 18:
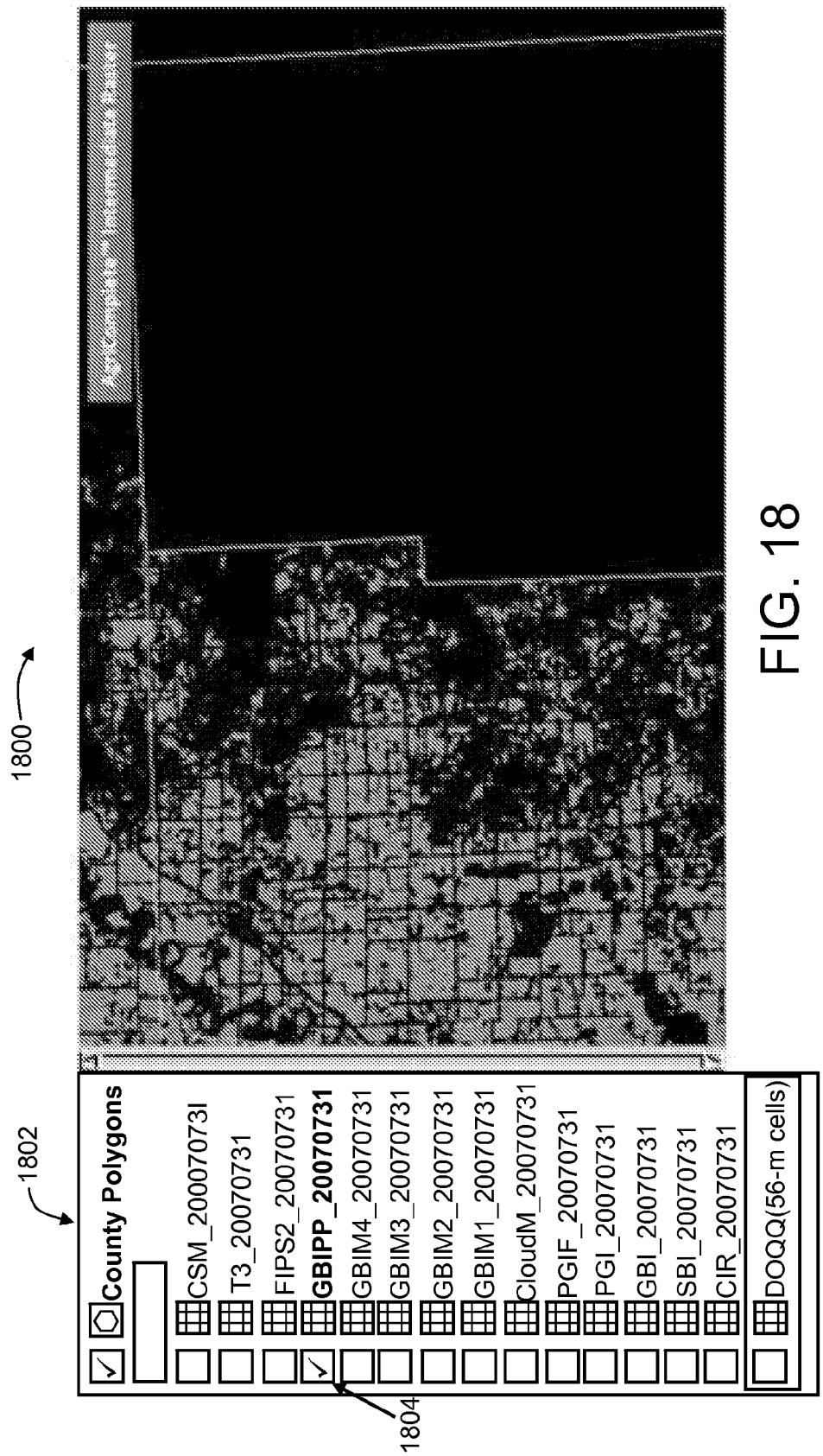
FIG. 18 is an image illustrating display of a pure-pixel green biomass index raster file that has been processed using the information system shown in FIG. 1.

In the exemplary embodiment, system 200 uses the fourth level primary index raster files to generate a plurality of pure-pixel primary index raster files. Specifically, server system 102 accesses the fourth level primary index raster files in a memory and/or in database 108, and performs 926 a pure-pixel analysis (PPA4) on the fourth level primary index raster file, thereby generating 928 a pure-pixel mask (PPM4) raster file. Server system 102 applies the PPM4 raster file to each of the fourth level primary index raster files to generate 930 the pure-pixel primary index raster files. The resulting raster files are hereinafter referred to as GBIPP, PGIPP, and SBIPP. Server system 102 then stores the pure-pixel primary index raster files in a memory and/or in database 108. In an alternative embodiment, system 200 does not generate the AOVM3 raster file or fourth level primary index raster files. Rather, system 200 generates the pure-pixel primary index raster files using the third level primary index raster files. FIG. 18 is an image 1800 produced by displaying the GBIPP raster file via client system 104. Image 1800 includes a selection portion 1802 that enables a user to select a raster file to display. For example, by selecting the GBIPP raster file 1804, the user may display the GBIPP raster file generated by server system 102. In some embodiments, a user may similarly display the PGIPP raster file or the SBIPP raster file.

Figure 19:
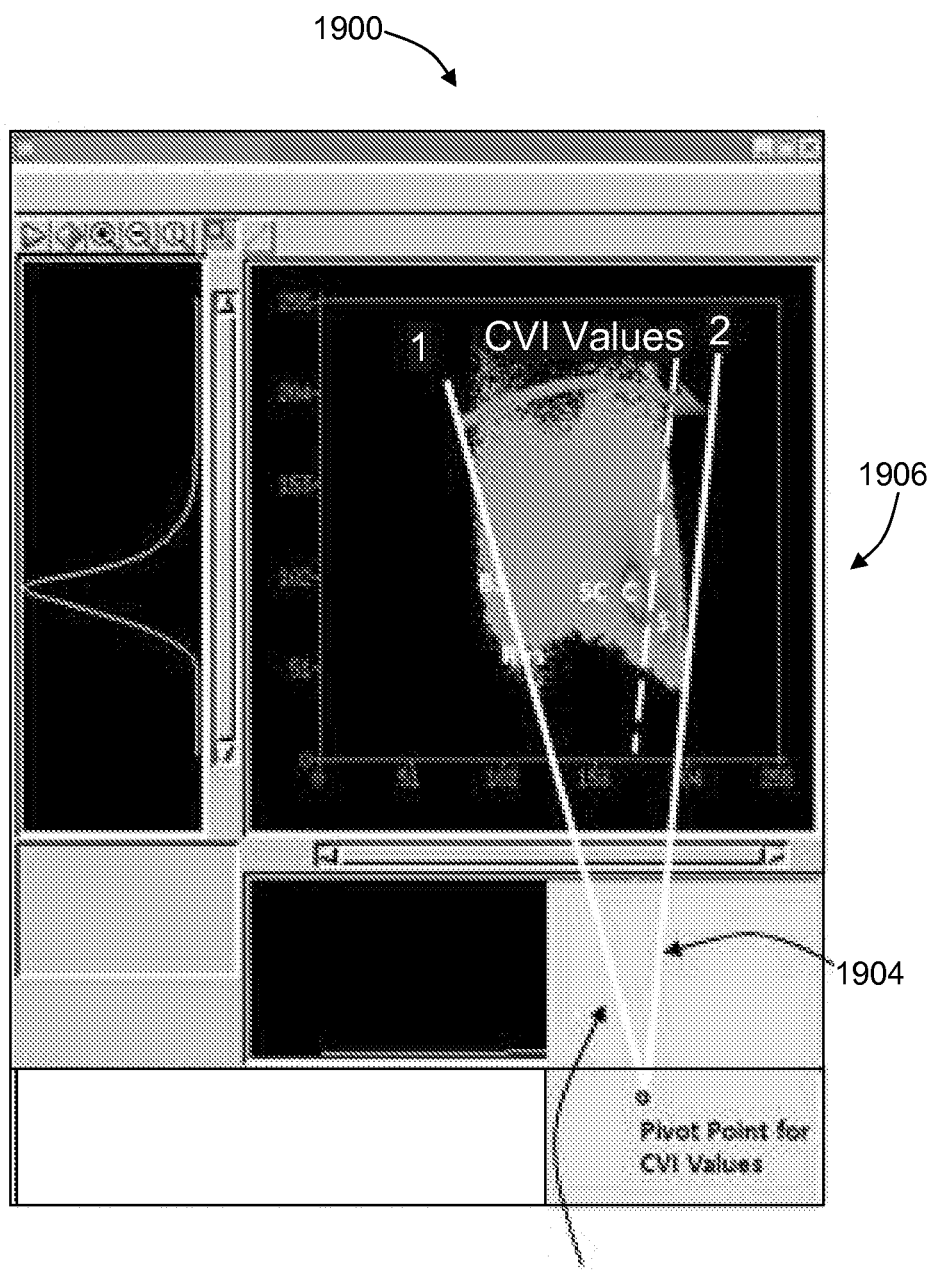
FIG. 19 is scatterplot illustrating a set of lines that define valid pixel value data of a combination vegetative index raster file that may be used by the information system shown in FIG. 1.
Figure 20:
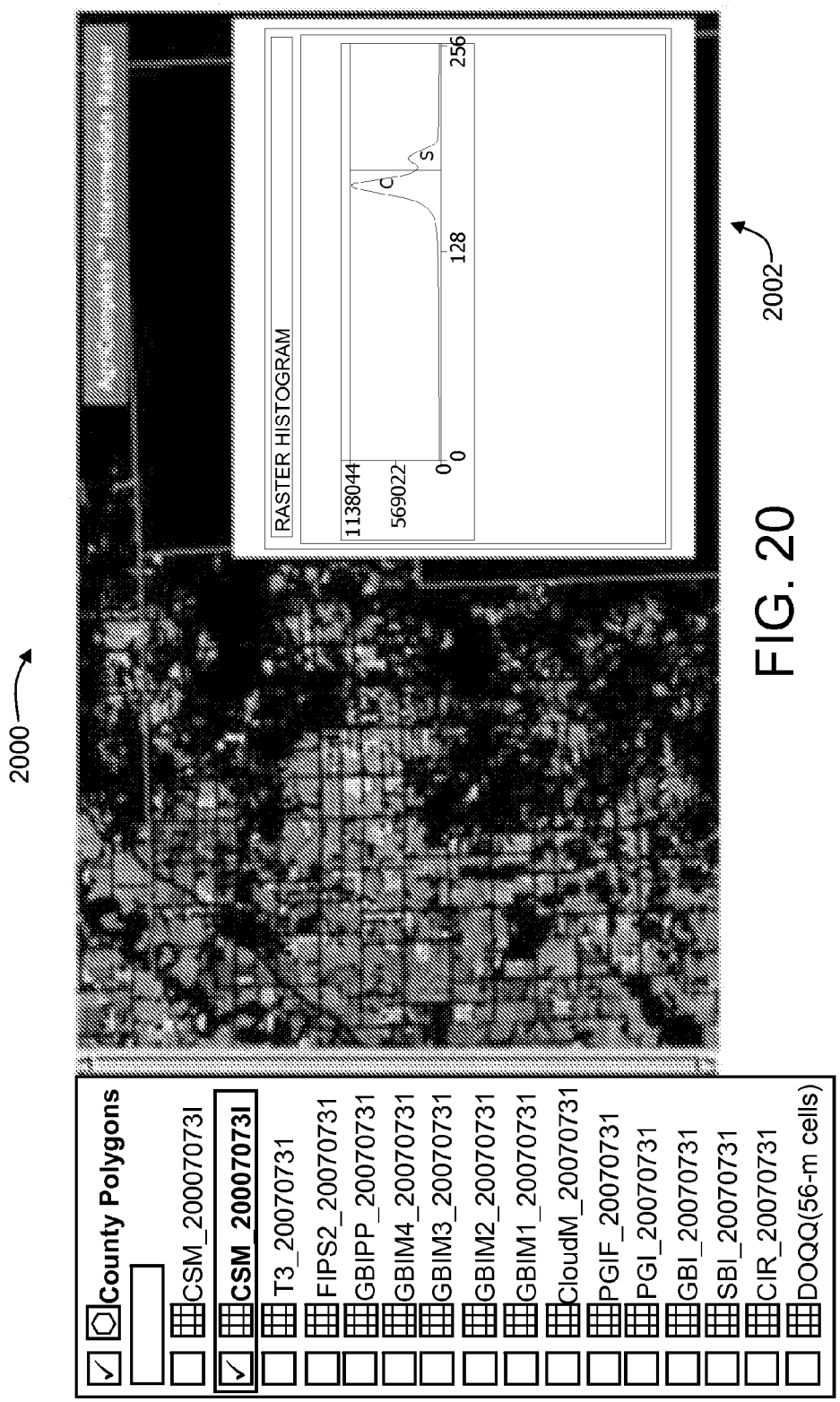
FIG. 20 is an image illustrating display of the combination vegetative index raster file shown in FIG. 19.

In the exemplary embodiment, system 200 generates 932 a combination vegetation index (CVIPP) raster file based on the GBIPP and PGIPP raster files. Specifically, server system 102 access the GBIPP and PGIPP raster files in a memory and/or in database 108, and displays the raster files in a scatterplot. More specifically, server system 102 transmits the raster files to client system 104, which displays a scatterplot of GBIPP pixel values and PGIPP pixel values. FIG. 19 is a scatterplot 1900 that illustrates a graphical comparison of GBIPP pixel values and PGIPP pixel values. In scatterplot 1900, GBIPP pixel values are shown along the x-axis and PGIPP pixel values are shown along the y-axis. Moreover, scatterplot 1900 includes two lines 1902 and 1904 that define calibrated values for the CVIPP raster file. As shown in FIG. 19, line 1902 has been drawn through both bare soil and dense vegetative residue. Moreover, line 1904 is based on a third line 1906 that splits two different crops, such as corn and soybeans, and which has been moved to the side of the data cloud. Server system 102 then determines a plurality of threshold values to divide CVIPP pixel values into a plurality of classes. For example, the CVIPP pixel values are classified into classes according to a type of land cover, including not yet emerged vegetation, emerged corn, emerged soybeans, senescent corn, emerged corn and soybeans, other vegetation, and none of the above. A particular threshold is likely to vary from one AOI to another and, as such, is input into client system 104 by the user. For example, FIG. 20 is an image 2000 that illustrates display of the CVIPP raster file along with a pixel value histogram 2002. The user determines the threshold at a point on histogram 2002 that separates corn pixel values from soybean pixel values. The CVIPP raster file serves as a better vegetation index than the GBIPP raster file alone because the GBIPP raster file is affected by variable residue for soils that are close to bare and by senescent leaves for mature crops. The CVIPP raster file reduces these effects, and serves as a single indicator that may be used to track a growing crop as it spans the range between non-emergence and a fully-developed mature canopy. In some embodiments, server system 102, for example, includes computer-readable storage media having a combination index component that causes a processor to generate the CVIPP raster file as described above.

Figure 21:
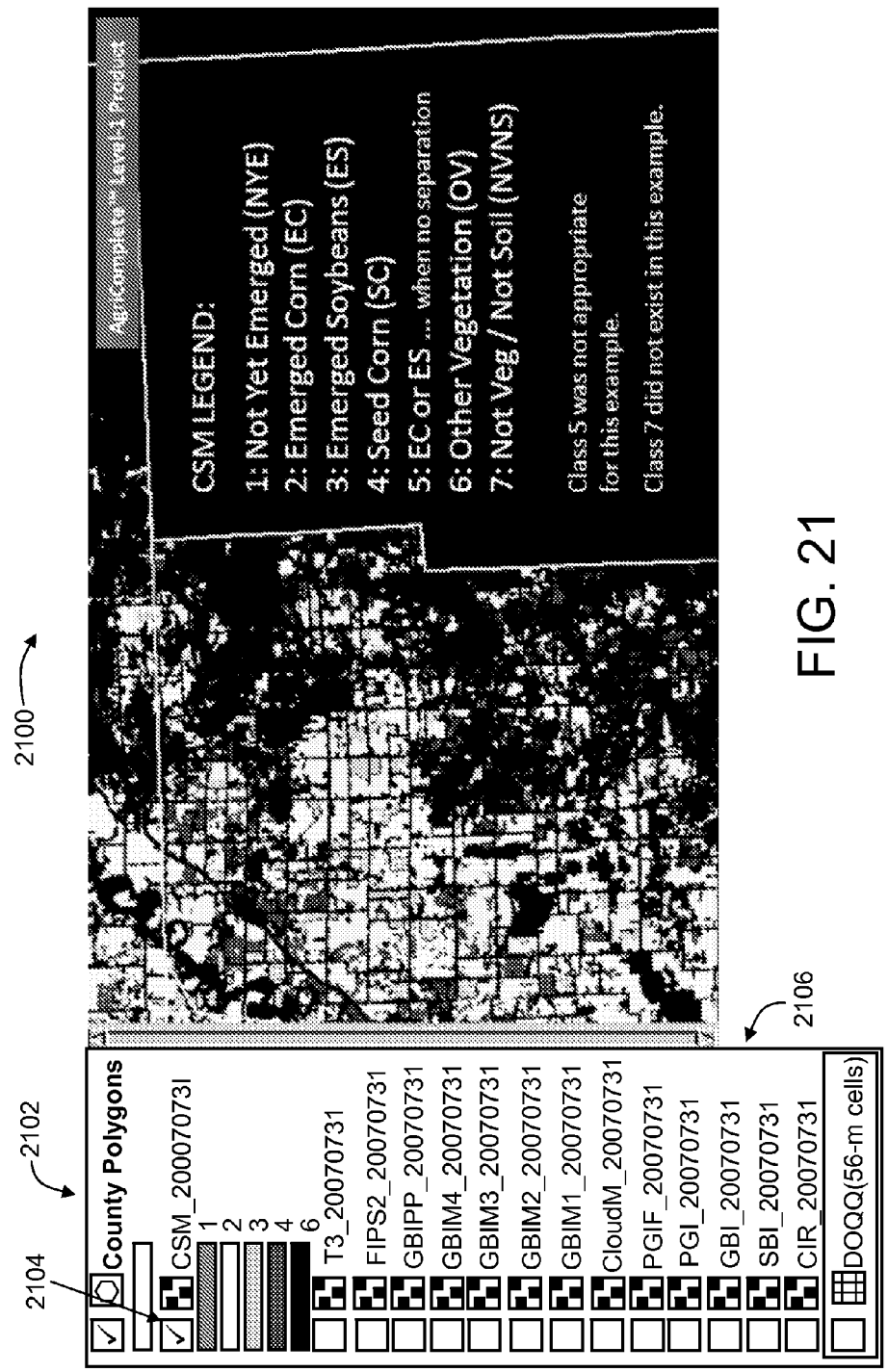
FIG. 21 is an image illustrating display of a corn soybean map raster file that has been processed using the information system shown in FIG. 1.

In the exemplary embodiment, system 200 then generates 934 a corn soybean map (CSM) raster file based on the CVIPP raster file. Specifically, server system 102 accesses the CVIPP raster file in a memory and/or in database 108, generates the CSM raster file, and then stores 936 the CSM raster file in a memory and/or in database 108. In some embodiments, server system 102, for example, includes computer-readable storage media having a storage component that causes a processor to store the CSM raster file in the memory and/or in database 108. In the exemplary embodiment, server system 102 then creates 938 a CSM report based on the CSM raster file. In some embodiments, server system 102 and/or client system 104, for example, include computer-readable storage media having a display component that causes a processor to display the CSM report. Client system 104 is used to display 940 the CSM report and/or the CSM raster file, as shown in FIG. 21. Specifically, FIG. 21 is an image 2100 produced by displaying the CSM raster file via client system 104. Image 2100 includes a selection portion 2102 that enables a user to select a raster file to display. For example, by selecting the CSM raster file 2104, the user may display the CSM raster file generated by server system 102 using a key 2106 that relates displayed pixel values to the corresponding class according to a color or a shade of gray. The user may also display the CSM report (not shown) that includes information within the AOI such as, but not limited to, a percentage of corn, a percentage of soybeans, and/or a percentage of not-yet emerged vegetation. The CSM report may also include information such as the acreage for each crop and/or GBI average values for each crop. Moreover, during pre-emergence, each fresh CSM report may include classes, such as other vegetation classes and/or non-vegetation classes, which may be used to repair the original CLUM raster file to avoid incorrect classification of pixel values in later uses.

Exemplary embodiments of systems, methods, and computer-readable storage media for generating agricultural information products are described above in detail. The systems, methods, and storage media are not limited to the specific embodiments described herein but, rather, steps of the methods and/or components of the system and/or apparatus may be utilized independently and separately from other steps and/or components described herein. Further, the described steps and/or components may also be defined in, or used in combination with, other systems, methods, and/or apparatus, and are not limited to practice with only the systems, methods, and storage media as described herein.

A computing device or computer such as described herein has one or more processors or processing units and a system memory. The computer typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for generating a raster file based on a plurality of primary index raster files that are associated with an area of interest (AOI) using a computer coupled to a remote sensing device via a network, wherein the computer includes an input device, a display, and a memory, the method comprising:
    receiving, by the computer, a plurality of AOI raster files via the network;
    generating the plurality of primary index raster files including a green biomass index (GBI) raster file, a pigmentation index (PGI) raster file, and a soil brightness index (SBI) raster file;
    generating, by the computer, a plurality of levels for each of the plurality of primary index raster files based on the plurality of AOI raster files, wherein generating the plurality of levels comprises generating at least a first level GBI raster file (GBIM1), a first level PGI raster file (PGIM1), a first level SBI raster file (SBIM1), a second level GBI raster file (GBI2), a second level PGI raster file (PGI2), and a second level SBI raster file (SBI2);
    generating, by the computer, a combination vegetation index (CVIPP) raster file based on a highest level of the GBI and PGI raster files;
    generating, by the computer, a corn soybean map (CSM) raster file based on the CVIPP raster file;
    storing the CSM raster file into the memory; and displaying, via the display, a CSM report based on the CSM raster file.

2. The method according to claim 1, wherein the plurality of AOI raster files includes a common land unit mask (CLUM) raster file, a federal information processing standards (FIPS) raster file, and an orthorectified reference image (ORI) of the AOI.

3. The method according to claim 2, wherein the CLUM raster file is based on a user-selected pixel resolution of the AOI.

4. The method according to claim 2, wherein the FIPS raster file is used to assign a unique FIPS code to each pixel in the AOI.

5. The method according to claim 2, further comprising generating a cloud mask raster file based on the PGI and SBI raster files.

6. The method according to claim 5, wherein generating a plurality of levels for each of the plurality of primary index raster files comprises:
generating a plurality of first level raster files based on the primary index raster files and the cloud mask raster file, the plurality of first level raster files including the first level GBI raster file (GBIM1), the first level PGI raster file (PGIM1), and the first level SBI raster file (SBIM1); and
generating a plurality of second level raster files based on the plurality of first level raster files, the plurality of second level raster files including the second level GBI raster file (GBI2), the second level PGI raster file (PGI2), and the second level SBI raster file (SBI2).

7. The method according to claim 6, further comprising:
displaying the SBIM1 raster file via the display;
selecting, via user input, a portion of the CLUM raster file that includes an entire area of the SBIM1 raster file to generate a supplemental CLUM (CLUM2) raster file; and
extracting a portion of the FIPS raster file that corresponds to the entire area of the SBIM1 raster file to generate a supplemental FIPS (FIPS2) raster file.

8. The method according to claim 7, wherein generating a plurality of levels for each of the plurality of primary index raster files further comprises generating a plurality of third level raster files based on the plurality of second level raster files and the CLUM2 raster file, including a third level GBI raster file (GBI3), a third level PGI raster file (PGI3), and a third level SBI raster file (SBI3).

9. The method according to claim 8, wherein generating a plurality of levels for each of the plurality of primary index raster files further comprises generating a plurality of pure pixel raster files, including a pure pixel GBI raster file (GBIPP), a pure pixel PGI raster file (PGIPP), and a pure pixel SBI raster file (SBIPP).

10. The method according to claim 9, wherein generating a plurality of pure pixel raster files comprises:
generating an area of validity mask (AOVM3) raster file based on the SBI3 raster file and the ORI;
generating a plurality of fourth level raster files based on the plurality of third level raster files and the AOVM3 raster file, including a fourth level GBI raster file (GBI4), a fourth level PGI raster file (PGI4), and a fourth level SBI raster file (SBI4);
generating a pure pixel analysis (PPA4) raster file based on the plurality of fourth level raster files;
generating a pure pixel mask (PPM4) raster file based on the PPA4 raster file; and
applying the PPM4 raster file to each of the plurality of fourth level raster files.

11. The method according to claim 10, wherein generating a combination vegetation index (CVIPP) raster file comprises:
displaying a scatterplot that correlates pixel values of the GBIPP raster file to pixel values of the PGIPP raster file;
receiving, via user input, calibrated CVIPP pixel values based on the scatterplot; and
classifying each pixel value of the CVIPP raster file in to one of a plurality of classes.

12. The method of claim 11, wherein the plurality of classes corresponds to a plurality of types of land cover based on a plurality of predetermined threshold pixel values.

13. The method of claim 12, wherein generating a CVIPP raster file further comprises receiving, via user input, one of the plurality of threshold pixel values based on a histogram of the CVIPP pixel values.

14. An information system configured to generate a supplementary index raster file based on a plurality of primary index raster files that are associated with an area of interest (AGI), the information system comprising:
a computer system comprising a memory and a processor coupled to the memory, wherein the computer system is configured to:
receive a plurality of AOI raster files including a common land unit mask (CLUM) raster file, a federal information processing standards (FIPS) raster file, and an orthorectified reference image (ORI) of the AOI;
generate the plurality of primary index raster files including a green biomass index (GBI) raster file, a pigmentation index (PGI) raster file, and a soil brightness index (SBI) raster file;
generate a plurality of levels for each of the plurality of primary index raster files based on the plurality of AOI raster files by generating at least a first level GBI raster file (GBIM1), a first level PGI raster file (PGIM1), a first level SBI raster file (SBIM1), a second level GBI raster file (GBI2), a second level PGI raster file (PGI2), and a second level SBI raster file (SBI2);
generate a combination vegetation index (CVIPP) raster file based on a highest level of the GBI and PGI raster files;
generate a corn soybean map (CSM) raster file based on the CVIPP raster file;
store the CSM raster file into the memory; and display a CSM report based on the CSM raster file.

15. The information system according to claim 14, wherein said computer system is further configured to generate a cloud mask raster file based on the PGI and SBI raster files.

16. The information system according to claim 15, wherein said computer system is further configured to:
generate a plurality of first level raster files based on the primary index raster files and the cloud mask raster file, the plurality of first level raster files including the first level GBI raster file (GBIM1), the first level PGI raster file (PGIM1), and the first level SBI raster file (SBIM1); and
generate a plurality of second level raster files based on the plurality of first level raster files, the plurality of second level raster files including the second level GBI raster file (GBI2), the second level PGI raster file (PGI2), and the second level SBI raster file (SBI2).

17. The information system according to claim 16, wherein said computer system is further configured to:
display the SBIM1 raster file via the display;
receive a user-selected a portion of the CLUM raster file that includes an entire area of the SBIM1 raster file to generate a supplemental CLUM (CLUM2) raster file; and
extract a portion of the FIPS raster file that corresponds to the entire area of the SBIM1 raster file to generate a supplemental FIPS (FIPS2) raster file.

18. The information system according to claim 17, wherein said computer system is further configured to generate a plurality of third level raster files based on the plurality of second level raster files and the CLUM2 raster file, including a third level GBI raster file (GBI3), a third level PGI raster file (PGI3), and a third level SBI raster file (SBI3).

19. The information system according to claim 18, wherein said computer system is further configured to:
generate an area of validity mask (AOVM3) raster file based on the SBI3 raster file and the ORI;
generate a plurality of fourth level raster files based on the plurality of third level raster files and the AOVM3 raster file, including a fourth level GBI raster file (GBI4), a fourth level PGI raster file (PGI4), and a fourth level SBI raster file (SBI4);
generate a pure pixel analysis (PPA4) raster file based on the plurality of fourth level raster files; generate a pure pixel mask (PPM4) raster file based on the PPA4 raster file; and
apply the PPM4 raster file to each of the plurality of fourth level raster files to generate a plurality of pure pixel raster files, including a pure pixel GBI raster file (GBIPP), a pure pixel PGI raster file (PGIPP), and a pure pixel SBI raster file (SBIPP).

20. The information system according to claim 19, wherein said computer system is configured to generate the CVIPP raster file by:
displaying a scatterplot that correlates pixel values of the GBIPP raster file to pixel values of the PGIPP raster file;
receiving at least one user-selected calibrated CVIPP pixel value based on the scatterplot; and
classifying each pixel value of the CVIPP raster file in to one of a plurality of classes.

21. The information system of claim 20, wherein the plurality of classes corresponds to a plurality of types of land cover based on a plurality of predetermined threshold pixel values.

22. One or more non-transitory computer-readable storage media having computer-executable components for generating a supplementary index raster file based on a plurality of primary index raster files that are associated with an area of interest (AOI), the components comprising:
a data reception component that when executed by at least one processor causes the at least one processor to receive a plurality of AOI raster files via a network;
a primary index component that when executed by at least one processor causes the at least one processor to generate the plurality of primary index raster files including a green biomass index (GBI) raster file, a pigmentation (PGI) raster file, and a soil brightness index (SBI) raster file;
a masking component that when executed by at least one processor causes the at least one processor to generate a cloud mask raster file based on the PGI and SBI raster files;
a level generation component that when executed by at least one processor causes the at least one processor to generate a plurality of levels for each of the plurality of primary index raster files by generating at least a first level GBI raster file (GBIM1), a first level PGI raster file (PGIM1), a first level SBI raster file (SBIM1), a second level GBI raster file (GBI2), a second level PGI raster file (PGI2), and a second level SBI raster file (SBI2);
a combination index component that when executed by at least one processor causes the at least one processor to generate a combination vegetation index (CVIPP) raster file based on a highest level of the GBI and PGI raster files;

a map component that when executed by at least one processor causes the at least one processor to generate a corn soybean map (CSM) raster file based on the CVIPP raster file;
a storage component that when executed by at least one processor causes the at least one processor to store the CSM raster file in a memory; and
a display component that when executed by at least one processor causes the at least one processor to transmit a CSM report to a display device, wherein the CSM report is based on the CSM raster file.

23. The non-transitory computer-readable storage media according to claim 22, wherein the plurality of AOI raster files includes a common land unit mask (CLUM) raster file, a federal information processing standards (FIPS) raster file, and an orthorectified reference image (ORI) of the AOI.

24. The non-transitory computer-readable storage media according to claim 23, wherein the level generation component causes the at least one processor to:
generate a plurality of first level raster files based on the primary index raster files and the cloud mask raster file, the plurality of first level raster files including the first level GBI raster file (GBIM1), the first level PGI raster file (PGIM1), and the first level SBI raster file (SBIM1); and
generate a plurality of second level raster files based on the plurality of first level raster files, the plurality of second level raster files including the second level GBI raster file (GBI2), the second level PGI raster file (PGI2), and the second level SBI raster file (SBI2).

25. The non-transitory computer-readable storage media according to claim 24, wherein the level generation component causes the at least one processor to:
transmit the SBIM1 raster file to the display device;
receive a user-selected portion of the CLUM raster file that includes an entire area of the SBIM1 raster file to generate a supplemental CLUM (CLUM2) raster file; and
extract a portion of the FIPS raster file that corresponds to the entire area of the SBIM1 raster file to generate a supplemental FIPS (FIPS2) raster file.

26. The non-transitory computer-readable storage media according to claim 25, wherein the level generation component causes the at least one processor to generate a plurality of third level raster files based on the plurality of second level raster files and the CLUM2 raster file, including a third level GBI raster file (GBI3), a third level PGI raster file (PGI3), and a third level SBI raster file (SBI3).

27. The non-transitory computer-readable storage media according to claim 26, wherein the level generation component causes the at least one processor to:
generate an area of validity mask (AOVM3) raster file based on the SBI3 raster file and the ORI;
generate a plurality of fourth level raster files based on the plurality of third level raster files and the AOVM3 raster file, including a fourth level GBI raster file (GBI4), a fourth level PGI raster file (PGI4), and a fourth level SBI raster file (SBI4);
generate a pure pixel analysis (PPA4) raster file based on the plurality of fourth level raster files;
generate a pure pixel mask (PPM4) raster file based on the PPA4 raster file; and
apply the PPM4 raster file to each of the plurality of fourth level raster files to generate a plurality of pure pixel raster files, including a pure pixel GBI raster file (GBIPP), a pure pixel PGI raster file (PGIPP), and a pure pixel SBI raster file (SBIPP).

28. The non-transitory computer-readable storage media according to claim 27, wherein the combination index component causes the at least one processor to:
    transmit a scatterplot to the display device, wherein the scatterplot correlates pixel values of the GBIPP raster file to pixel values of the PGIPP raster file;
    receive a user-selected calibrated CVIPP pixel value based on the scatterplot; and
    classify each pixel value of the CVIPP raster file in to one of a plurality of classes.

29. The non-transitory computer-readable storage media of claim 28, wherein the plurality of classes corresponds to a plurality of types of land cover based on a plurality of predetermined threshold pixel values.

30. The non-transitory computer-readable storage media of claim 28, wherein the user-selected calibrated CVIPP pixel value is based on a histogram of the CVIPP pixel values.

\* \* \* \* \*